United States Patent
Balasubramanian et al.

(10) Patent No.: US 11,792,617 B2
(45) Date of Patent: Oct. 17, 2023

(54) METHODS FOR SIDELINK PAGING

(71) Applicant: QUALCOMM Incorporated, San Diego, CA (US)

(72) Inventors: Anantharaman Balasubramanian, San Diego, CA (US); Shuanshuan Wu, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

(*) Notice: Subject to any disclaimer, the term of this patent is extended or adjusted under 35 U.S.C. 154(b) by 93 days.

(21) Appl. No.: 17/069,250

(22) Filed: Oct. 13, 2020

(65) Prior Publication Data

US 2021/0152992 A1    May 20, 2021

Related U.S. Application Data

(60) Provisional application No. 62/938,202, filed on Nov. 20, 2019.

(51) Int. Cl.
*H04W 4/40* (2018.01)
*H04W 68/00* (2009.01)
(Continued)

(52) U.S. Cl.
CPC ............ *H04W 4/40* (2018.02); *H04W 24/08* (2013.01); *H04W 68/005* (2013.01);
(Continued)

(58) Field of Classification Search
CPC ..... H04W 4/40; H04W 24/08; H04W 68/005; H04W 72/02; H04W 72/0446;
(Continued)

(56) References Cited

U.S. PATENT DOCUMENTS

2013/0258996 A1* 10/2013 Jung ................ H04W 72/1284
    370/329
2015/0119088 A1*  4/2015 Lee ..................... H04W 68/005
    455/458

(Continued)

FOREIGN PATENT DOCUMENTS

WO    2017136627 A1    8/2017

OTHER PUBLICATIONS

International Search Report and Written Opinion—PCT/US2020/061289—ISA/EPO—dated Feb. 18, 2021.

*Primary Examiner* — Rina C Pancholi
(74) *Attorney, Agent, or Firm* — Procopio, Cory, Hargreaves & Savitch LLP

(57) ABSTRACT

Aspects are provided of dedicated paging schemes for vehicle UEs to communicate with pedestrian UEs in V2P communication and that also allows pedestrian UEs to power-efficiently monitor for such V2P communications. A vehicle UE provides an indication of a V2P communication to a pedestrian UE in a resource from a plurality of resources. The vehicle UE then transmits a message to the pedestrian UE based on the indication. The pedestrian UE monitors the plurality of resources for the indication of the V2P communication from the vehicle UE. The pedestrian UE receives the indication of the V2P communication. The pedestrian UE then receives the message from the vehicle UE based on the indication.

27 Claims, 13 Drawing Sheets

(51) Int. Cl.
    *H04W 24/08*    (2009.01)
    *H04W 72/0446*  (2023.01)
    *H04W 76/11*    (2018.01)
    *H04W 72/02*    (2009.01)
    *H04W 92/18*    (2009.01)

(52) U.S. Cl.
    CPC ....... *H04W 72/02* (2013.01); *H04W 72/0446* (2013.01); *H04W 76/11* (2018.02); *H04W 92/18* (2013.01)

(58) Field of Classification Search
    CPC . H04W 76/11; H04W 92/18; H04W 72/0406; H04W 76/14; H04W 68/02; H04L 5/1469; Y02D 30/70
    See application file for complete search history.

(56) References Cited

U.S. PATENT DOCUMENTS

| | | | |
|---|---|---|---|
| 2016/0269994 A1 | 9/2016 | Pocha et al. | |
| 2017/0280471 A1* | 9/2017 | Lee | H04W 72/12 |
| 2019/0075548 A1 | 3/2019 | Lee et al. | |
| 2021/0297841 A1* | 9/2021 | Jung | H04W 68/005 |
| 2021/0400634 A1* | 12/2021 | Lee | H04W 92/18 |

* cited by examiner

METHODS FOR SIDELINK PAGING

CROSS REFERENCE TO RELATED APPLICATION(S)

This application claims the benefit of U.S. Provisional Patent Application Ser. No. 62/938,202, entitled "Methods for Sidelink Paging," and filed on Nov. 20, 2019, which is expressly incorporated by reference herein in its entirety.

BACKGROUND

Technical Field

The present disclosure relates generally to communication systems, and more particularly, to vehicle-to-pedestrian (V2P), vehicle-to-vehicle (V2V), vehicle-to-everything (V2X), or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE) (e.g., a receiving device). An example apparatus monitors a plurality of resources for an indication of a V2P communication from a second UE. The example apparatus receives the indication of the V2P communication. The example apparatus also receives a message from the second UE based on the indication.

In another aspect of the disclosure, a method, a computer-readable medium, and an apparatus are provided for wireless communication at a first UE (e.g., a transmitting device). An example apparatus provides an indication of a V2P communication to a second UE in a resource from a plurality of resources. The example apparatus also transmits a message to the second UE based on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
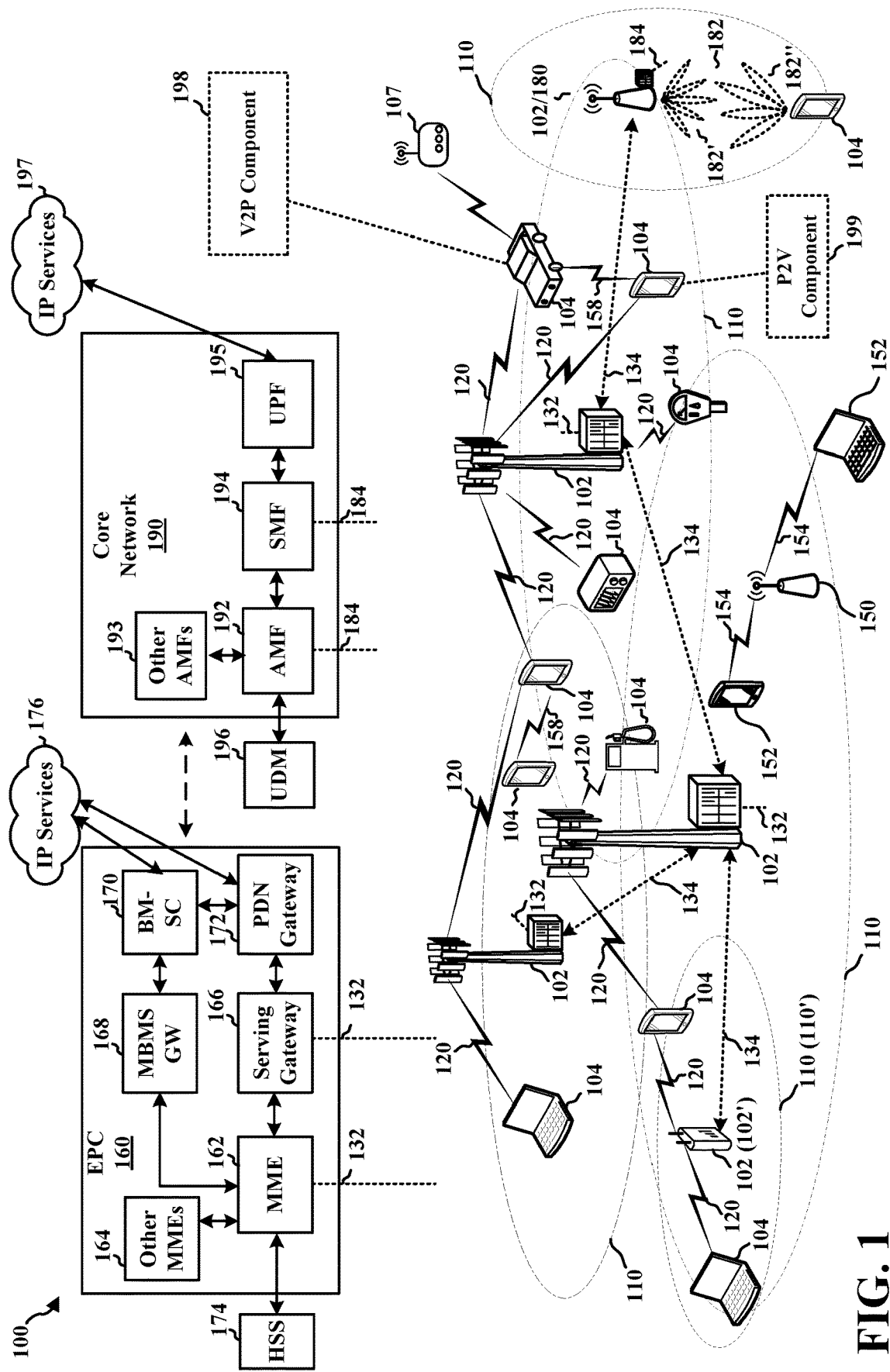
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including base stations 102/180 and UEs 104.

A vehicle-based communication device or UE may communicate with a communication device or UE of a pedestrian using sidelink or V2P communication. Such communication between vehicles and pedestrians may be important for safety (e.g., preventing collisions). Thus, it may be helpful for vehicle UEs to efficiently page pedestrian UEs in order to communicate with the pedestrian to prevent such collisions. Moreover, a paging mechanism that enables efficient power consumption by pedestrian UEs when monitoring for such pages from vehicle UEs may help with battery consumption because the UEs of pedestrians may have less available battery power than vehicle UEs. Accordingly, the present disclosure provides paging schemes for vehicle UEs to communicate with pedestrian UEs in V2P communication and allows pedestrian-based UEs to power-efficiently monitor for such V2P communications. In various examples, a paging indicator based scheme and a non-paging indicator based scheme are provided.

Referring again to FIG. 1, in certain aspects, the UE 104 may comprise a V2P component 198 configured to provide an indication of a V2P communication to a second UE in a resource from a plurality of resources. The example V2P component 198 may also be configured to receive the indication of the V2P communication. The example V2P component 198 may also be configured to transmit a message to the second UE based on the indication.

Still referring to FIG. 1, in certain aspects, the UE 104 may comprise a P2V component 199 configured to monitor a plurality of resources for an indication of a V2P communication from a second UE. The example P2V component 199 may also be configured to receive a message from the second UE based on the indication.

Although the following description may provide examples for V2X/V2P/P2V/D2D communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz–7.125 GHz) and FR2 (24.25 GHz–52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz–300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182″. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, aspects of beamforming may similarly be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
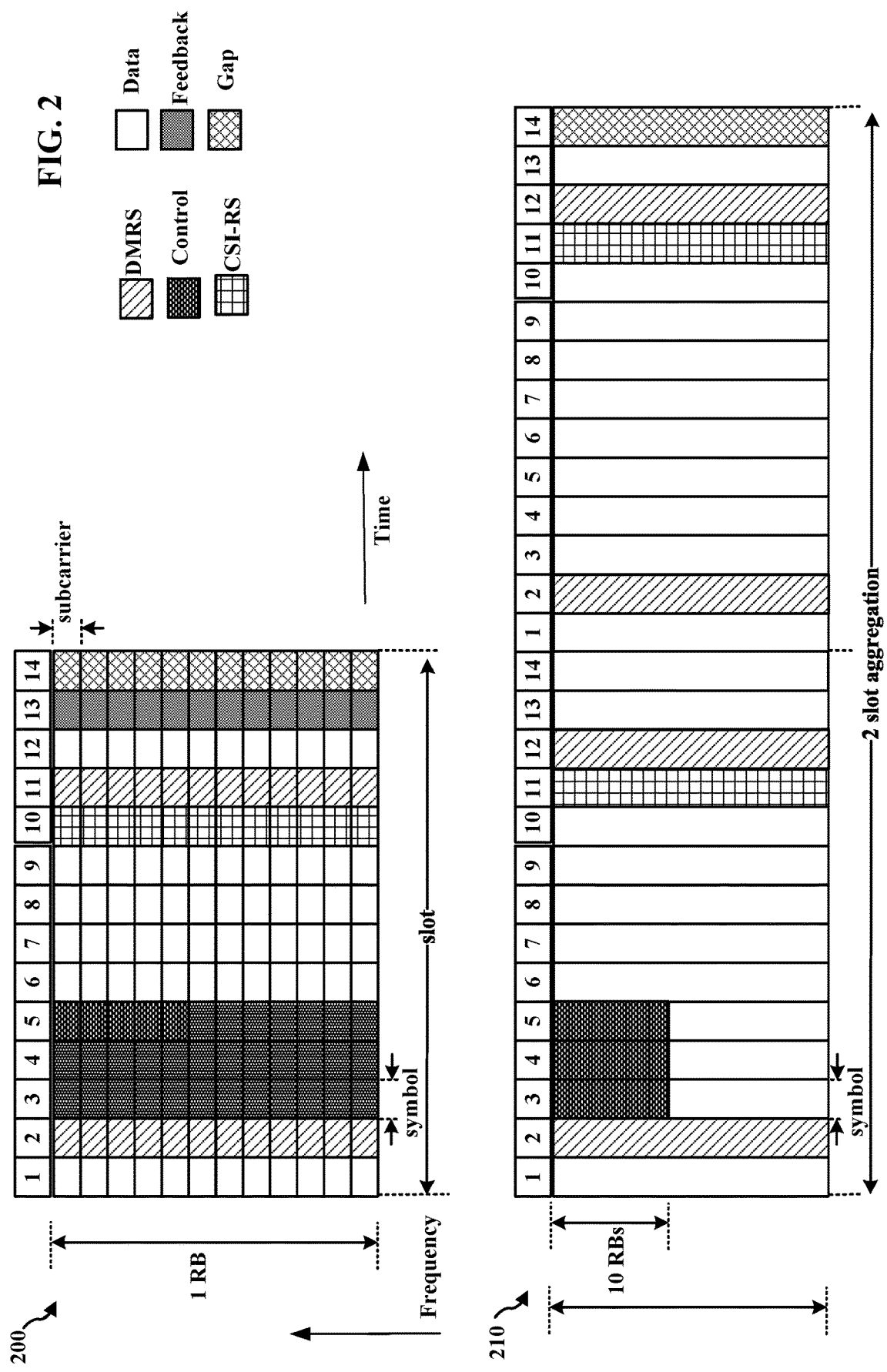
FIG. 2 illustrates example aspects of a sidelink slot structure.

FIG. 2 illustrates example diagrams 200 and 210 illustrating examples slot structures that may be used for sidelink communication (e.g., between UEs 104, RSU 107, etc.). The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
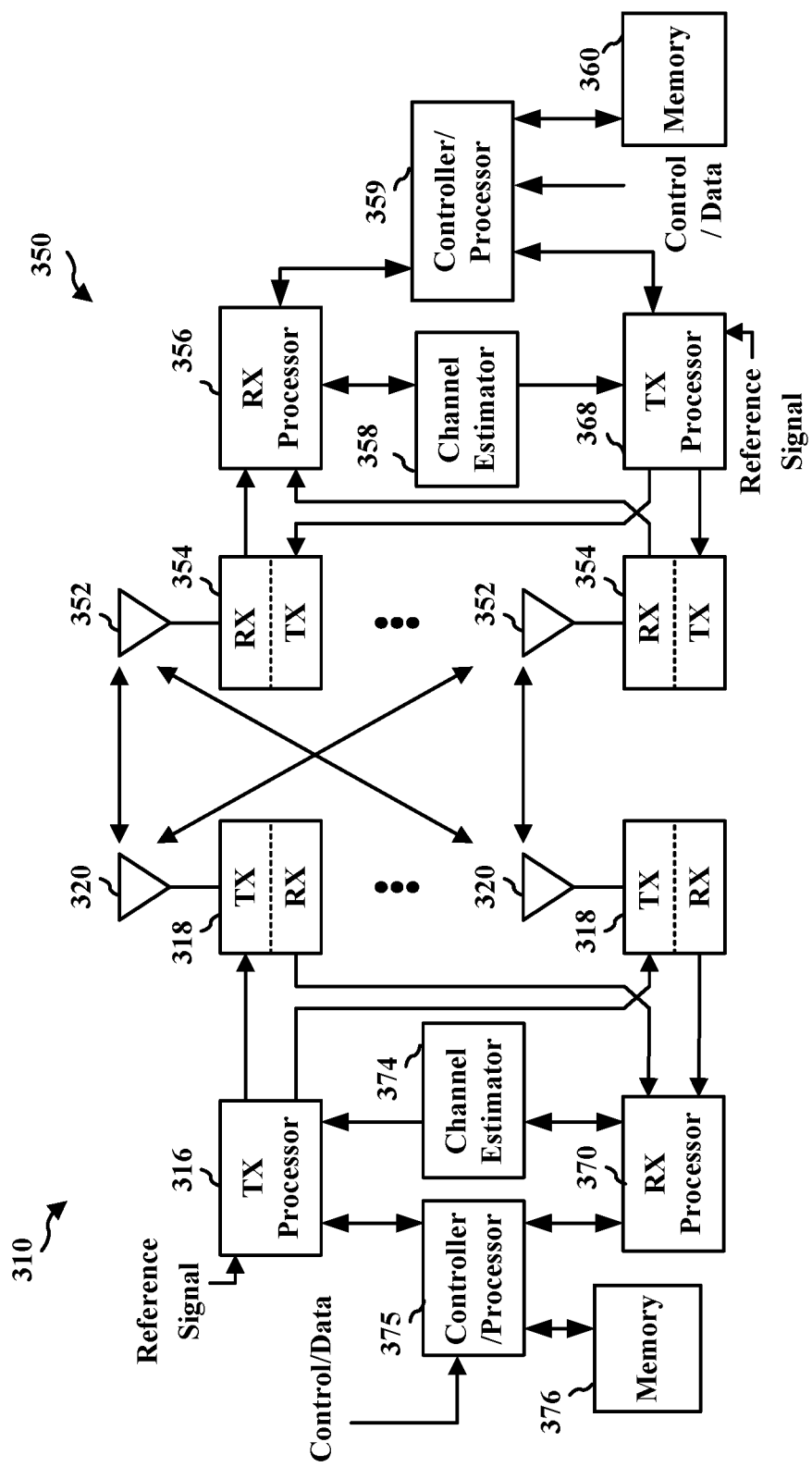
FIG. 3 is a diagram illustrating an example of a first device and a second device involved in wireless communication based, e.g., on V2P, V2V, V2X, and/or other device-to-device communication.

FIG. 3 is a block diagram of a first wireless communication device 310 in communication with a second wireless communication device 350 based on sidelink. In some examples, the devices 310, 350 may communicate based on V2X or other D2D communication. The communication may be based on sidelink using a PC5 interface. The devices 310, 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate an RF carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The transmission is processed at the device 310 in a manner similar to that described in connection with the receiver function at the device 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359, and/or at least one of the TX processor 316, the RX processor 370, and the controller/processor 375 may be configured to perform aspects in connection with the V2P component 198 and/or the P2V component 199 of FIG. 1.

Figure 4:
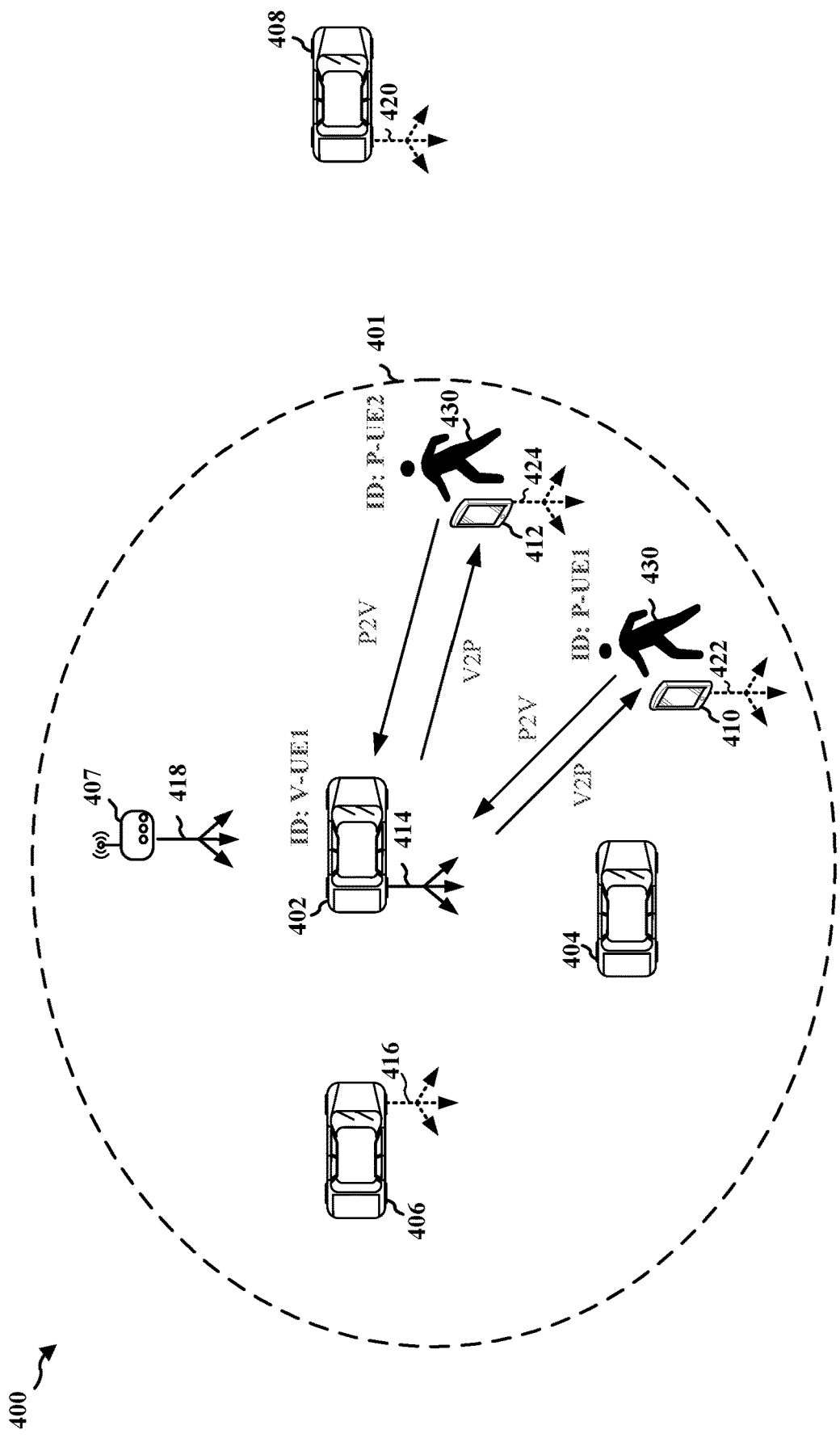
FIG. 4 is an example diagram illustrating wireless communication between devices based on V2X/V2V/V2P/P2V/D2D communication.

FIG. 4 illustrates an example 400 of wireless communication between devices based on sidelink, such as V2X/V2V/V2P/P2V/D2D communication. The communication may be based on a slot structure comprising aspects described in connection with FIG. 2. For example, a transmitting first UE 402 may transmit a transmission 414, for example, comprising a control channel and/or a corresponding data channel, that may be received by receiving UEs 404, 406, 408, 410, 412. A control channel may include information for decoding a data channel and may also be used by the receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408, 410, 412 may each be capable of operating as a transmitting device in addition to operating as a receiving device. In the illustrated example, the UE 406 is illustrated as transmitting transmission 416 and the UE 408 is illustrated as transmitting transmission 420. In addition, the UE 410 is illustrated as transmitting transmission 422 and the UE 412 is illustrated as transmitting transmission 424. The transmissions 414, 416, 420, 422, 424 may be broadcast or multicast to nearby devices. For example, the first UE 402 may transmit a communication intended for receipt by other UEs within a range 401 of the first UE 402. Additionally or alternatively, an RSU 407 may receive communication 418 from and/or transmit communication 418 to UEs 402, 404, 406, 408, 410, 412.

The example UEs 402, 404, 406, 408 and/or the example RSU 407 of FIG. 4 may comprise a V2P component, such as the example V2P component 198 described in connection with FIG. 1. The pedestrian UEs 410, 412 may comprise a P2V component, such as the example P2V component 199 described in connection with FIG. 1.

As described above and illustrated in FIG. 4, a vehicle-based communication device or UE (e.g., the first vehicle UE 402) may communicate with a communication device or UE of a pedestrian 430 (e.g., the pedestrian UEs 410, 412) using sidelink or V2P communication. Such communication between vehicles and pedestrians may be important for safety. For instance, a pedestrian 430 may be crossing a street in front of the first vehicle UE 402, resulting in the first vehicle UE 402 being in a collision course with the pedestrian 430. Thus, it may be helpful for vehicle UEs (e.g., the first vehicle UE 402) to efficiently page pedestrian UEs (e.g., the pedestrian UEs 410, 412) in order to communicate with the pedestrian 430 to prevent such collisions. Moreover, a paging mechanism that enables efficient power consumption by pedestrian UEs when monitoring for such pages from vehicle UEs may help with battery consumption because the UEs of pedestrians may have less available battery power than vehicle UEs.

The present disclosure provides dedicated paging schemes for vehicle UEs to communicate with pedestrian UEs in V2P communication, and allows pedestrian-based UEs to monitor for such V2P communications in a battery-efficient manner. For example, disclosed techniques provide a paging indicator based scheme in which a plurality of resources including P2V resource portions, paging indicator resources, and V2P resource portions are time-division multiplexed with non-V2P/P2V resources. The vehicle UEs may page pedestrian UEs using the paging indicator resources. The paging indicator resources may include a common paging resource pool for pedestrians in proximity to the vehicle UE, a pedestrian UE-specific paging resource dedicated to a particular pedestrian UE, or a vehicle UE-specific paging resource dedicated to a particular vehicle UE. The pedestrian UE monitors for an indication (e.g., a paging indicator signal) in the paging indicator resource, and if an indication is received from a vehicle UE, the pedestrian UE may monitor for and receive V2P communications from the vehicle UE in the V2P resource portion. The pedestrian UE may also transmit data to the vehicle UE in the P2V resource portion. If no indication is received, the pedestrian UE may save power by refraining from monitoring for V2P communications in the V2P resource portion. More details of the example paging indicator based scheme are described in connection with FIGS. 5, 6, and/or 7.

In additional examples, disclosed techniques provide a non-paging indicator based scheme in which a plurality of resources including P2V resource portions and V2P resource portions are time-division multiplexed with non-V2P/P2V resources. In contrast to the paging-indicator based scheme described above, explicit paging indication resources are not provided in this example. Rather, the vehicle UEs send information (e.g., SCI, etc.) to pedestrian UEs in the V2P resource portions. The pedestrian UE monitors for an indication (e.g., the information) in the V2P resource portion, and if an indication is received from a vehicle UE, the pedestrian UE may monitor for and receive V2P communications from the vehicle UE in the next V2P resource portion or in subsequent symbols of the same V2P resource portion. The pedestrian UE may also transmit data to the vehicle UE in the P2V resource portion. If no indication is received (e.g., in the V2P resource portion), the pedestrian UE may save power by refraining from monitoring for V2P communications in the next (or the same) V2P resource portion. More details of the non-paging indicator based scheme are described in connection with FIG. 8.

Figure 5:
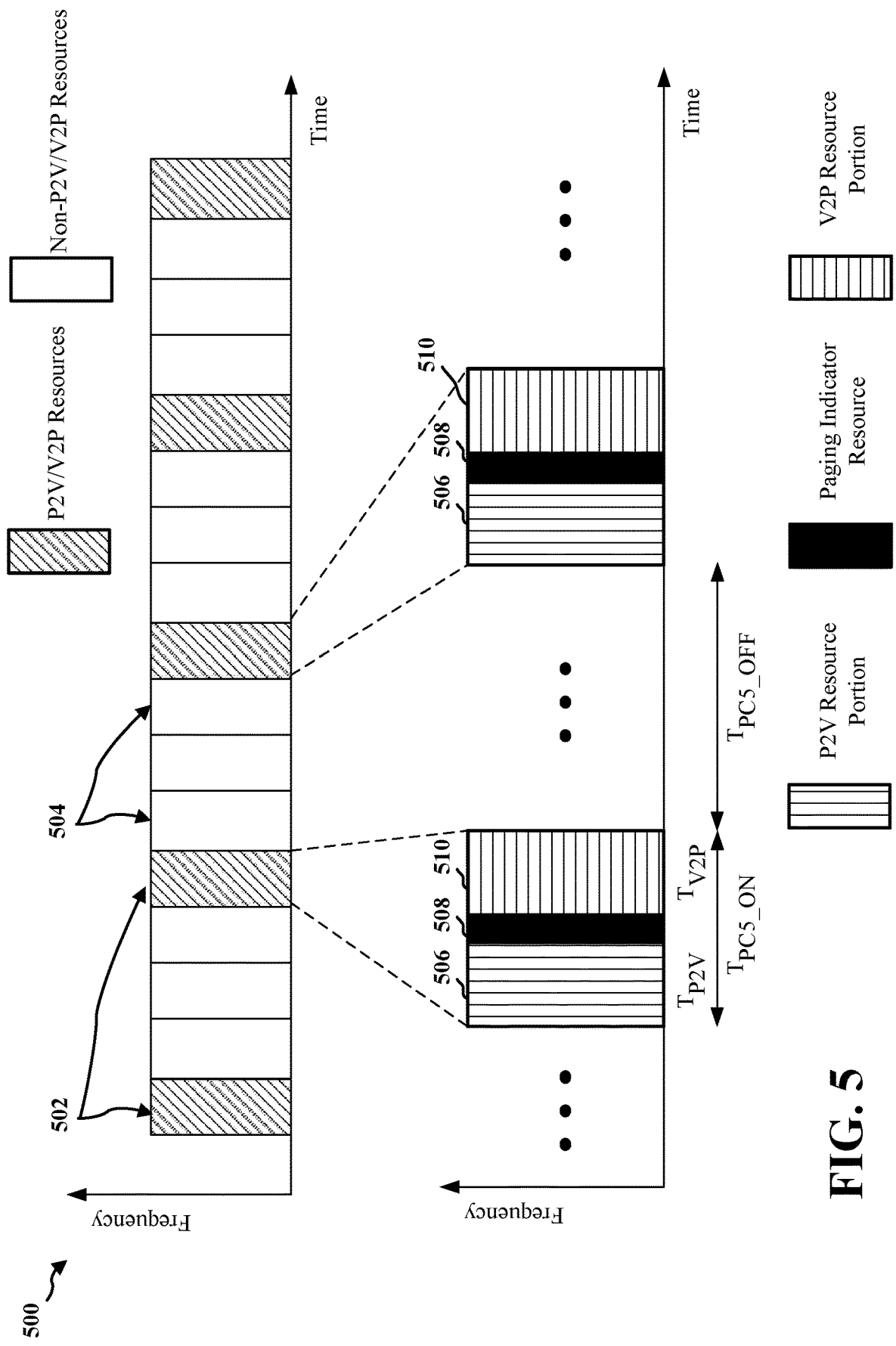
FIG. 5 a diagram of one example of a paging-indicator based scheme.

FIG. 5 illustrates a diagram 500 of an example of a paging-indicator based scheme, as presented herein. A vehicle UE (e.g., the UEs 402, 404, 406, 408 of FIG. 4) may transmit a plurality of resources 502, 504 to one or more pedestrian UEs (e.g., the pedestrian UEs 410, 412 of FIG. 4) and/or vehicle UEs (e.g., the UEs 402, 404, 406, 408). In particular, the resources 502 may include one or more pools of resources dedicated for V2P and P2V communication between vehicle UEs and pedestrian UEs, while the resources 504 may include one or more separate pools of resources for non-V2P/P2V communication. For instance, the non-V2P/P2V resources 504 may be used for V2X communication (e.g., between the vehicle UEs 402 and 404) or otherwise for communication not involving a pedestrian. The resources 502, 504 may be time-division multiplexed (TDM), as illustrated in FIG. 5. While FIG. 5 illustrates each pool of V2P/P2V resources 502 being separated by three pools of non-V2P/P2V resources 504, any number of pools of V2P/P2V resources may follow or precede any number of pools of non-V2P/P2V resources.

Each pool of V2P/P2V resources 502 may include separate resource portions for V2P/P2V communication and paging. For example, the V2P/P2V resources 502 may each include a P2V resource portion 506 for communication from pedestrian UEs to vehicle UEs, paging indicator resources 508 for pedestrian UEs to monitor paging indicator signals from vehicle UEs, and a V2P resource portion 510 for communication from vehicle UEs to pedestrian UEs. The P2V resource portion 506 and the V2P resource portion 510 may each span multiple resource blocks in one or more contiguous slots (e.g. the RBs and slots in examples 200, 210 of FIG. 2). For example, the P2V resource portion 506 may span a slot duration of $T_{P2V}$, and the V2P resource portion 510 may span a slot duration of $T_{V2P}$, and the respective slot durations $T_{P2V}$ and $T_{V2P}$ may be identical or different. Similarly, the paging indicator resources 508 may span multiple resource blocks in one or more slots. As illustrated in FIG. 5, the combined slot duration "$T_{PC5\_ON}$" for each pool of V2P/P2V resources 502 used in P2V/V2P communication over the PC5 interface may be less than the slot duration "$T_{PC5\_OFF}$" for intervening pools of non-V2P/P2V resources 504 used in non-P2V/V2P communication over the PC5 interface. Alternatively, the combined slot duration $T_{PC5\_ON}$ may be the same as or greater than the slot duration $T_{PC5\_OFF}$.

In the example of FIG. 5, the paging indicator resources 508 include a common resource pool for vehicle UEs to page all pedestrian UEs within range (e.g., the range 401 of FIG. 4) of the vehicle. The common resource pool may be preconfigured by the network (e.g., by the EPC 160 and/or the core network 190) for all pedestrian UEs 410, 412. Any vehicle UE that intends to communicate with a pedestrian (e.g., when the vehicle detects a potential collision with a pedestrian 430) may page the pedestrian UE by transmitting a paging indicator signal in one or more resources of the common resource pool. For example, the vehicle UE may encrypt the paging indicator signal with the paging radio network temporary identifier (P-RNTI) or other identifier of a target pedestrian UE, and transmit the paging indicator signal in the paging indicator resources 508. After sending the paging indicator signal, the vehicle UE may transmit a message to the pedestrian UE in the V2P resource portion 510 (e.g., a request to the pedestrian to move or perform another action).

The paging indicator signal may include a common sequence, such as a Zadoff-Chu sequence or other sequence, which is transmitted in the slot(s) of the paging indicator resources 508 across one or more RBs. The common sequence may be preconfigured by the network for all vehicle UEs. Thus, any vehicle UE may use the same preconfigured sequence when paging any pedestrian UE using the common paging indicator resources. The paging indicator signal and/or the common paging indicator resources may also be dependent on a location (e.g. geography or zone) of the paging vehicle UE and the paged pedestrian UE. For instance, referring to FIG. 4, if the vehicle UEs 402, 404, 406 are within one region and the vehicle UE 408 is in a different region, the network may configure the paging indicator resources 508 for the vehicle UE 408 to be different than the common paging resources for the vehicle UEs 402, 404, 406 (e.g., in duration, number of RBs, periodicity, etc.).

A pedestrian UE may monitor the paging indicator resources 508 (e.g., the common resource pools) for the paging indicator signal from any of the vehicle UEs. For example, each pedestrian UE may monitor the paging indicator resources 508 and decode any paging indicator signals in the paging indicator resources that are encrypted with the pedestrian UE's identifier (e.g., the P-RNTI or other identifier). If a pedestrian UE detects a paging indicator signal in the common resource pool that is directed to that pedestrian UE from a vehicle UE, the pedestrian UE may determine that a message may be received from the vehicle UE in the V2P resource portion 510 and may therefore monitor the resources in the V2P resource portion 510 for the message. Otherwise, the pedestrian UE may refrain from monitoring the V2P resource portion 510 for V2P communications. Thus, pedestrian UEs may benefit from power savings from discontinuous reception (DRX). For example, pedestrian UEs may sleep during the duration $T_{V2P}$ (or a subsequent duration $T_{P2V}$) when a page is not received in the paging indicator resources 508 and may wake during the duration $T_{V2P}$ (or the duration $T_{P2V}$) when a page is received in the paging indicator resources 508. For instance, pedestrian UEs may sleep during the V2P resource portions and/or P2V resource portions when there are no or few vehicles nearby or when the pedestrian UE is otherwise not being paged.

Accordingly, the example of FIG. 5 allows for paging indicator resources 508 to be commonly used by vehicle UEs to page all pedestrian UEs with one common preconfigured sequence. Thus, paging may be accomplished with minimal differences in configuration among multiple UEs. Moreover, even if multiple vehicle UEs simultaneously page pedestrian UEs, by using the same sequence, the different paging indicator signals may be coherently added together, preventing unnecessary signal loss.

Figure 6:
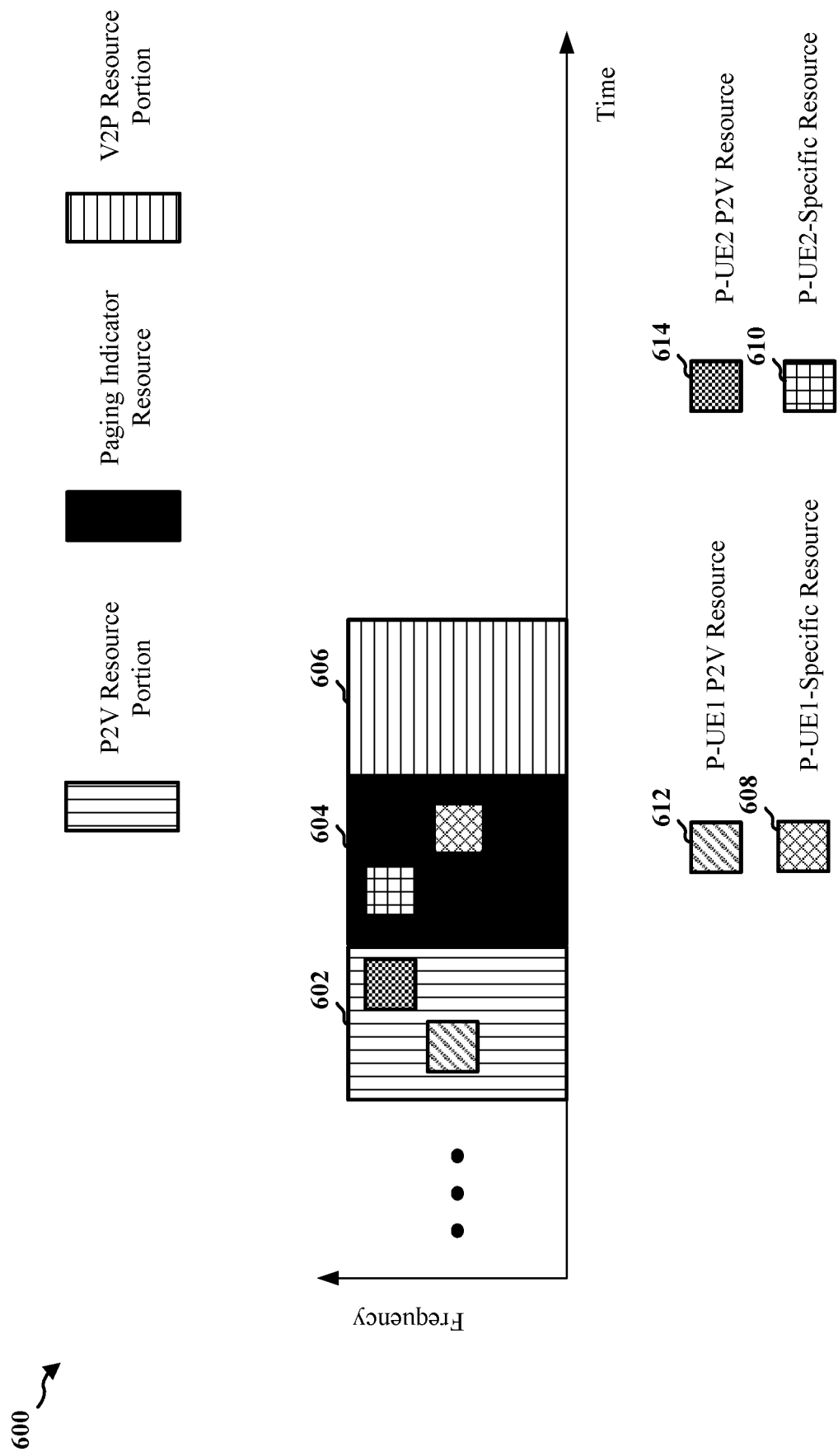
FIG. 6 is a diagram of another example of a paging-indicator based scheme.

FIG. 6 illustrates a diagram 600 of another example of a paging-indicator based scheme, as presented herein. As described above with respect to FIG. 5, a vehicle UE (e.g., the vehicle UEs 402, 404, 406, 408 of FIG. 4) may transmit a plurality of resources (e.g., the resources 502, 504) to one or more pedestrian UEs (e.g., the pedestrian UEs 410, 412 of FIG. 4) and/or vehicle UEs (e.g., the vehicle UEs 402, 404, 406, 408), including one or more pools of resources dedicated for V2P and P2V communication between vehicle UEs and pedestrian UEs. Also, as described above with respect to FIG. 5, each pool of resources of FIG. 6 may include separate resource portions for V2P/P2V communication and paging, including a P2V resource portion 602 for communication from pedestrian UEs to vehicle UEs, paging indicator resources 604 for pedestrian UEs to monitor paging indicator signals from vehicle UEs, and a V2P resource portion 606 for communication from vehicle UEs to pedestrian UEs. The P2V resource portion 602 and the V2P resource portion 606 may each span multiple resource blocks in one or more contiguous slots (e.g., the RBs and slots in examples 200, 210 of FIG. 2). Similarly, the paging indicator resources 604 may span one or more resource blocks in one or more slots. The size of the pool of the paging indicator resources 604 may be preconfigured by the network (e.g., by the EPC 160 and/or the core network 190).

However, unlike the example of FIG. 5, the paging indicator resources 604 of FIG. 6 include pedestrian UE-specific paging resources 608, 610 for vehicle UEs to page particular pedestrian UEs within range (e.g., within the range 401 of FIG. 4) of the vehicle. For instance, and with respect to the example of FIG. 4, a first pedestrian UE-specific paging resource 608 may be assigned by the network to the first pedestrian UE 410 (e.g., P-UE 1), while a second pedestrian UE-specific paging resource 610 may be assigned by the network to the second pedestrian UE 412 (e.g., P-UE 2). Any vehicle UE that intends to communicate with a particular pedestrian (e.g., the pedestrian UEs 410, 412), for instance, when the vehicle is in a collision course with a pedestrian 430, may page the pedestrian UE by transmitting a paging indicator signal in the respective pedestrian UE-specific paging resource 608, 610. Since the resources are pedestrian UE-specific, the vehicle UE may not need to encrypt the paging indicator signal with the P-RNTI or other identifier of a target pedestrian UE, but may simply transmit the paging indicator signal in the corresponding pedestrian UE-specific paging resource 608, 610 in the paging indicator resources 604. After sending the paging indicator signal to a particular pedestrian UE, the vehicle UE may transmit a message to that pedestrian UE in the V2P resource portion 606 (e.g., to request the pedestrian to move or perform another action).

The pedestrian UE-specific paging resources 608, 610 may be based on P2V resources 612, 614 in which the pedestrian UEs 410, 412 transmit data to the vehicle UEs. For example, as illustrated in FIG. 6, the pedestrian UE-specific paging resources 608, 610 may be configured by the network (e.g., by the EPC 160 and/or the core network 190) or selected by respective pedestrian UEs to include the same subchannel(s) or subcarrier(s) as the P2V resources 612, 614. The P2V resources 612, 614 may be configured by the network, and may indicate the symbols/slots and subchannel (s) in which the pedestrian UEs may respectively send data to the vehicle UEs. For instance, the first pedestrian UE 410 may be configured to transmit data in P2V resources 612 spanning multiple symbols on one subchannel, while the second pedestrian UE 412 may be configured to transmit data in P2V resources 614 spanning multiple symbols on another subchannel. Likewise, the first pedestrian UE 410 may be configured to monitor or select to monitor for paging indicator signals in the corresponding first pedestrian UE-specific paging resources 608 on the former subchannel, while the second pedestrian UE 412 may be configured or select to monitor for paging indicator signals in the corresponding second pedestrian UE-specific paging resources 610 on the latter subchannel. Although FIG. 6 illustrates the P2V resources 612, 614 and the pedestrian UE-specific paging resources 608, 610 being separate both in time and frequency, the P2V resources 612, 614 and the pedestrian UE-specific paging resources 608, 610 may alternatively overlap (at least partially) in time or frequency.

The pedestrian UE-specific paging resources 608, 610 may also be based on an identifier of the pedestrian UE. For example, the pedestrian UE-specific paging resources 608, 610 may be configured by the network or selected by respective pedestrian UEs to include different starting symbols and subchannels based on the P-RNTI or other identifier of the pedestrian UE and/or the number of physical resource blocks in each pool of paging indicator resources 604. For instance, each pedestrian UE-specific paging resource 608, 610 may be calculated based on Equation 1 (below).

$$\text{P-UE ID mod } N \qquad \text{Equation 1}$$

In Equation 1, the variable "P-UE ID" refers to the identifier of the pedestrian UE, and the variable "N" refers to the number of physical resource blocks (PRBs) in the pool of the paging indicator resources 604. Thus, referring to FIG. 4, the first pedestrian UE 410 may have a different identifier (i.e., P-UE ID 1) than the second pedestrian UE 412 (i.e., P-UE ID 2), and therefore the respective pedestrian UEs 410, 412 may be configured to monitor or select to monitor for paging indicator signals in different pedestrian UE-specific paging resources 608, 610.

The vehicle UE may select a sequence for the paging indicator signal, such as a Zadoff-Chu sequence or other sequence, which is transmitted in the pedestrian UE-specific paging resources 608, 610 in the pool of the paging indicator resources 604. The sequence may be a common sequence preconfigured by the network for all vehicle UEs. Thus, any vehicle UE may select to use the same preconfigured sequence when paging respective pedestrian UEs in the pedestrian UE-specific paging resources 608, 610. Alternatively, the sequence may be a vehicle UE-specific sequence. The vehicle UE-specific sequence may be based on an identifier of the vehicle UE. For example, the vehicle UE-specific sequence may be configured by the network or selected by respective vehicle UEs based on the RNTI or other identifier of the vehicle UE and/or the number of paging indication sequences for the vehicle UE. For instance, each vehicle UE-specific sequence may be calculated based on Equation 2 (below).

$$\text{V-UE ID mod } K \qquad \text{Equation 2}$$

In Equation, the variable "V-UE ID" refers to the identifier of the vehicle UE, and the variable "K" refers to the total number of paging indication sequences configured by the network. Thus, referring to FIG. 4, the first vehicle UE 402 may have a different identifier (i.e., V-UE ID 1) than the other vehicle UEs 404, 406, 408, and, therefore, the vehicle UEs 402, 404, 406, 408 may be configured to transmit or select to transmit paging indicator signals with different sequences. As a result, pedestrian UEs that receive paging indicator signals from different vehicle UEs may identify each vehicle UE based on the sequence.

Pedestrian UEs may monitor their respective pedestrian UE-specific paging resources 608, 610 in the paging indicator resource 604 for the paging indicator signal from any of the vehicle UEs. For example, each pedestrian UE may receive the paging indicator resources 604 and decode any paging indicator signals only in the pedestrian UE-specific paging resources 608, 610 that are configured for that respective pedestrian UE. If a pedestrian UE detects a paging indicator signal from a vehicle UE in the pedestrian UE-specific paging resource 608, 610 that is directed to that pedestrian UE, the pedestrian UE may determine that a message may be received from the vehicle UE in corresponding resources of the V2P resource portion 606 and may therefore monitor the resources in the V2P resource portion 606 for the message. The monitored resources in the V2P resource portion 606 may be based on the subchannels of the P2V resources 612, 614 or the identifier of the pedestrian UE, and may similarly correspond up to the time and frequency mapping of the pedestrian UE-specific paging resources 608, 610 in which the paging indicator signal is received. Otherwise, the pedestrian UE may refrain from monitoring the V2P resource portion 606 for V2P communications. Thus, pedestrian UEs may not only benefit from power savings from discontinuous reception (DRX), as described above with respect to FIG. 5, but may also benefit from further power savings by monitoring only their dedicated pedestrian UE-specific paging resource 608, 610, as opposed to the entire pool of paging indicator resources 604.

Figure 7:
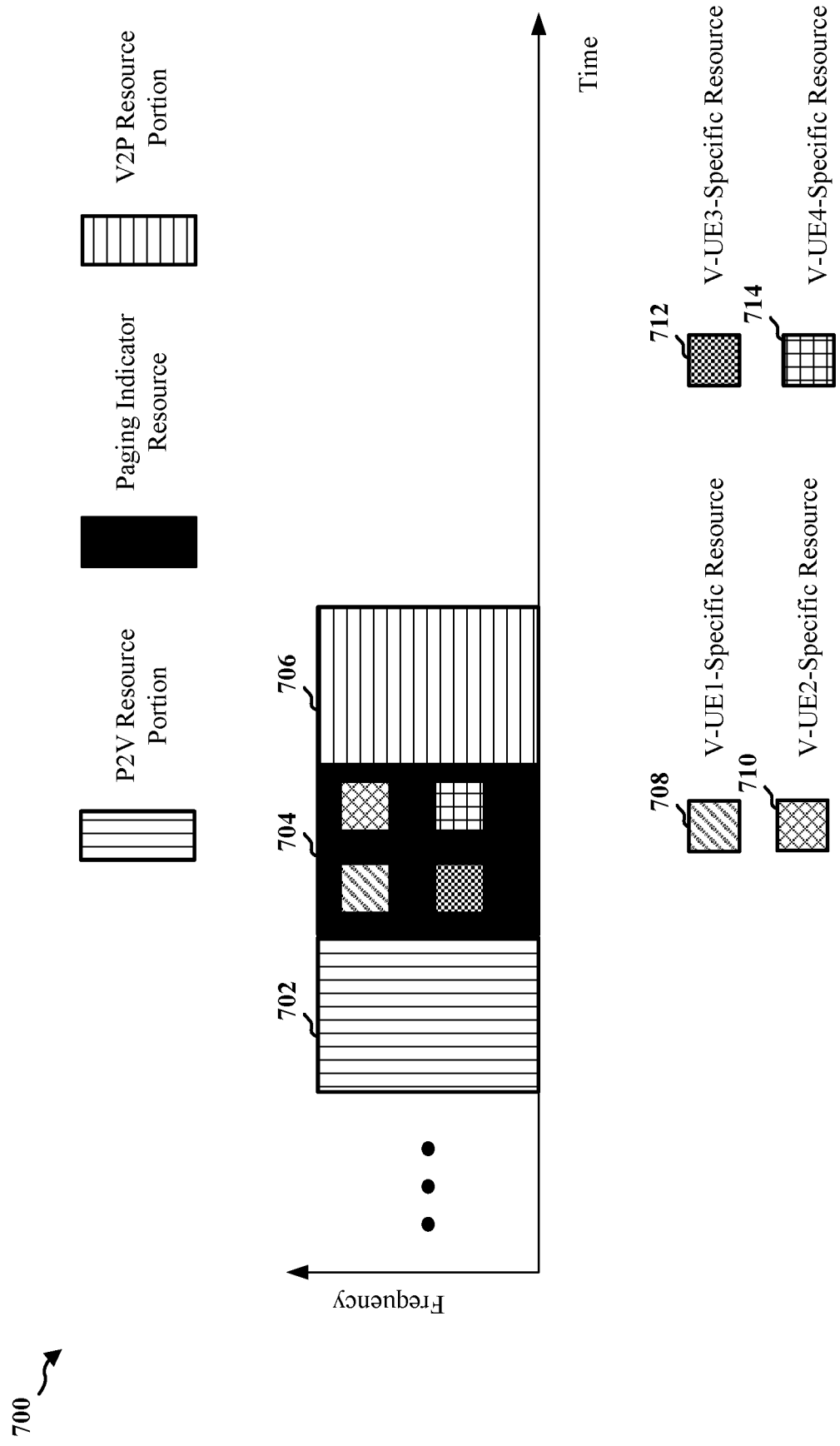
FIG. 7 is a diagram of another example of a paging-indicator based scheme.

FIG. 7 illustrates a diagram 700 of another example of a paging-indicator based scheme, as presented herein. As described above with respect to FIG. 5, a vehicle UE (e.g., the vehicle UEs 402, 404, 406, 408 of FIG. 4) may transmit a plurality of resources (e.g., the resources 502, 504) to one or more pedestrian UEs (e.g., the pedestrian UEs 410, 412) and/or vehicle UEs (e.g., the vehicle UEs 402, 404, 406, 408), including one or more pools of resources dedicated for V2P and P2V communication between vehicle UEs and pedestrian UEs. Also, as described above with respect to FIGS. 5 and 6, each pool of resources of FIG. 7 may include separate resource portions for V2P/P2V communication and paging, including a P2V resource portion 702 for communication from pedestrian UEs to vehicle UEs, paging indicator resources 704 for pedestrian UEs to monitor paging indicator signals from vehicle UEs, and a V2P resource portion 706 for communication from vehicle UEs to pedestrian UEs. The P2V resource portion 702 and the V2P resource portion 706 may each span multiple resource blocks in one or more contiguous slots (e.g., the RBs and slots in examples 200, 210 of FIG. 2). Similarly, the paging indicator resources 704 may span one or more resource blocks in one or more slots. The size of the pool of the paging indicator resources 704 may be preconfigured by the network (e.g., by the EPC 160 and/or the core network 190).

However, unlike the example of FIG. 6, the paging indicator resources 704 of FIG. 7 include vehicle UE-specific paging resources 708, 710, 712, 714 for vehicle UEs to page any pedestrian UEs within range (e.g., the range 401 of FIG. 4) of the vehicles. For instance, and with respect to the example of FIG. 4, a first vehicle UE-specific paging resource 708 may be assigned by the network to the first vehicle UE 402 (e.g., V-UE 1), a second vehicle UE-specific paging resource 710 may be assigned by the network to the second vehicle UE 404, a third vehicle UE-specific paging resource 712 may be assigned by the network to the third vehicle UE 406, and a fourth vehicle UE-specific paging resource 714 may be assigned by the network to the fourth vehicle UE 408. The vehicle UE-specific paging resources 708, 710, 712, 714 may be specific to a specific UE or a specific group of UEs. For example, a single vehicle UE-specific paging resource may be assigned to a single UE (e.g., the first vehicle UE 402) or to a group of UEs (e.g., the vehicle UEs 402, 404, 406, 408). Each vehicle UE that intends to communicate with pedestrian UEs (e.g., the pedestrian UEs 410, 412), for instance, when the vehicle is in a collision course with a pedestrian 430, may page the pedestrian UE by transmitting a paging indicator signal in its respective, vehicle UE-specific paging resource 708, 710, 712, 714. For example, the vehicle UE may encrypt the paging indicator signal with the P-RNTI or other identifier of a target pedestrian UE, and may transmit the paging indicator signal in the vehicle UE's corresponding vehicle UE-specific paging resource 708, 710, 712, 714 in the paging indicator resources 704. After sending the paging indicator signal to a particular pedestrian UE, the vehicle UE may transmit a message to that pedestrian UE in the V2P resource portion 706 (e.g., to request the pedestrian to move or perform another action).

The vehicle UE-specific paging resources 708, 710, 712, 714 may each be based on an identifier of the vehicle UE. For example, the vehicle UE-specific paging resources 708, 710, 712, 714 may be selected by respective vehicle UEs (or configured by the network) to include different starting symbols and subchannels based on the RNTI or other identifier of the vehicle UE and/or the number of physical resource blocks in each pool of paging indicator resources 704. For instance, each vehicle UE-specific paging resource 708, 710, 712, 714 may be calculated based on Equation 3 (below).

$$\text{V-UE ID mod } N \qquad \text{Equation 3}$$

In Equation 3, the variable "V-UE ID" refers to the identifier of the vehicle UE, and the variable "N" refers to the number of physical resource blocks (PRBs) in the pool of paging indicator resources 704. Thus, referring to FIG. 4, the first vehicle UE 402 may have a different identifier (i.e., V-UE ID 1) than the other vehicle UEs 404, 406, 408, and therefore the respective vehicle UEs 402, 404, 406, 408 may select to transmit paging indicator signals in different vehicle UE-specific paging resources 708, 710, 712, 714. If the result of Equation 3 is the same for two different UEs, the two different UEs may have the same UE-specific paging resource. Although FIG. 7 illustrates a specific time-frequency allocation of vehicle UE-specific paging resources 708, 710, 712, 714, the vehicle UE-specific paging resources may occur in other times or frequencies of the paging indicator resources 704.

Pedestrian UEs may monitor the vehicle UE-specific paging resources 708, 710, 712, 714 in the paging indicator resource 704 for the paging indicator signal from the respective vehicle UEs. For example, each pedestrian UE may receive the paging indicator resources 704 and decode any paging indicator signals in the received paging indicator resources (e.g., by checking all possible vehicle UE-specific paging resources 708, 710, 712, 714). If a pedestrian UE detects a paging indicator signal directed to it from a vehicle UE in a respective vehicle UE-specific paging resource 708, 710, 712, 714, the pedestrian UE may determine that a message may be received from the vehicle UE in corresponding resources of the V2P resource portion 706 and may monitor the resources in the V2P resource portion 706 for the message. The monitored resources in the V2P resource portion 706 may be based on the identifier of the vehicle UE, for example, and may similarly correspond to the time and frequency mapping of the vehicle UE-specific paging resources 708, 710, 712, 714 in which the paging indicator signal is received. Otherwise, the pedestrian UE may refrain from monitoring the V2P resource portion 706 for V2P communications. Thus, although each pedestrian UE monitors the entire pool of paging indicator resource 704 for paging indicator signals from any vehicle UE (unlike the example of FIG. 6), pedestrian UEs may continue to benefit from power savings from discontinuous reception (DRX) as described above with respect to FIG. 5.

Figure 8:
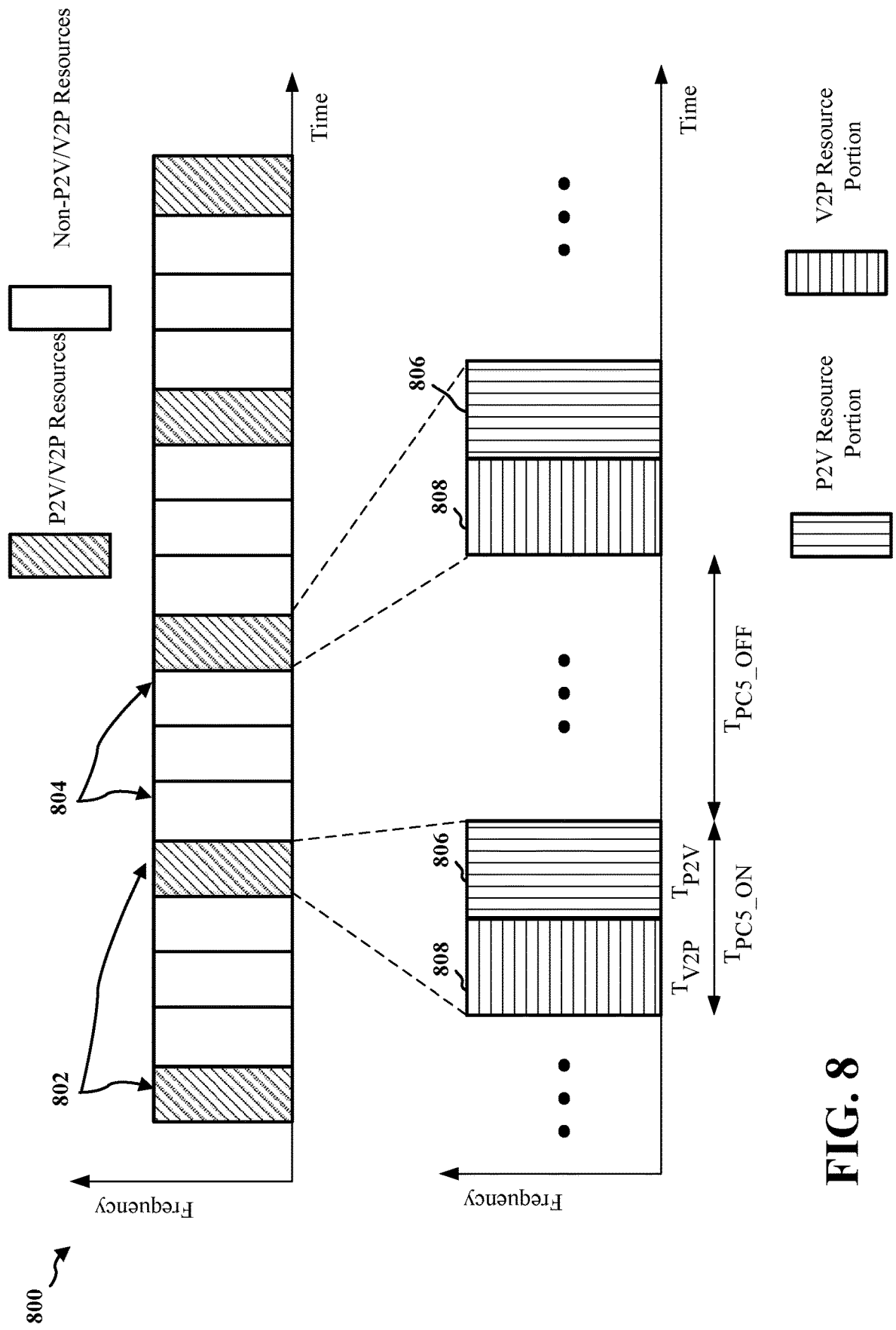
FIG. 8 is a diagram of an example of a non-paging-indicator based scheme.

FIG. 8 illustrates a diagram 800 of an example of a non-paging-indicator based scheme, as presented herein. A vehicle UE (e.g., the vehicle UEs 402, 404, 406, 408 of FIG. 4) may transmit a plurality of resources 802, 804 to one or more pedestrian UEs (e.g., the pedestrian UEs 410, 412 of FIG. 4) and/or the vehicle UEs (e.g., the vehicle UEs 402, 404, 406, 408). In particular, the resources 802 may include one or more pools of resources dedicated for V2P and P2V communication between vehicle UEs and pedestrian UEs (e.g., V2P/P2V resources), while the resources 804 may include one or more separate pools of resources for non-V2P/P2V communication (e.g., non-V2P/P2V resources). The resources 802, 804 may be time-division multiplexed (TDM) as illustrated in FIG. 8. While FIG. 8 illustrates each pool of V2P/P2V resources 802 being separated by three pools of non-V2P/P2V resources 804, any number of pools of V2P/P2V resources may follow or precede any number of pools of non-V2P/P2V resources.

Similar to the example of FIG. 5, each pool of V2P/P2V resources 802 may include separate resource portions for V2P/P2V communication and paging. For example, the V2P/P2V resources 802 may each include a P2V resource portion 806 for communication from pedestrian UEs to vehicle UEs, and a V2P resource portion 808 for communication from vehicle UEs to pedestrian UEs. While the example of FIG. 8 illustrates the P2V resource portion 806 following the V2P resource portion 808, the sequence may be reversed in other examples. The P2V resource portion 806 and the V2P resource portion 808 may each have a subchannel size spanning multiple resource blocks and multiple slots (e.g., the RBs and slots in examples 200, 210 of FIG. 2). For instance, the P2V resource portion 806 may span a slot duration of $T_{P2V}$, the V2P resource portion 808 may span a slot duration of $T_{V2P}$, and the slot durations $T_{P2V}$ and $T_{V2P}$ may be identical or different. As illustrated in FIG. 8, the combined slot duration "$T_{PC5\_ON}$" for each pool of V2P/P2V resources 802 used in P2V/V2P communication over the PC5 interface may be less than the slot duration "$T_{PC5\_OFF}$" for intervening pools of resources 804 used in non-P2V/V2P communication over the PC5 interface. Alternatively, the combined slot duration $T_{PC5\_ON}$ may be the same as or greater than the slot duration $T_{PC5\_OFF}$.

However, unlike the examples of FIGS. 5-7, the V2P/P2V resources 802 of FIG. 8 do not include paging indicator resources (e.g., the paging indicator resources 508 of FIG. 5) for pedestrian UEs to monitor paging indicator signals from vehicle UEs. Rather, the vehicle UEs page the pedestrian UEs in the V2P resource portion 808 itself, and the pedestrian UEs monitor for indications from the vehicle UEs in the V2P resource portion 808. For example, different vehicle UEs may send information to the pedestrian UEs in different subchannels of the V2P resource portion 808, and the vehicle UEs may transmit and the pedestrian UEs may receive unicast messages based on the information. In one example, any vehicle UE may transmit paging information, sidelink control information (SCI), or other information in one or more symbols of a particular subchannel or subchannels of the V2P resource portion 808, and any pedestrian UE may monitor the different subchannels for the information. The pedestrian UE may, thus, determine whether an upcoming unicast message (e.g., data) from that vehicle UE is expected to be received targeting the pedestrian UE. For instance, the information may schedule the unicast message in one or more subsequent symbols of the V2P resource portion 808 or a following V2P resource portion 808, and the vehicle UE may transmit the unicast message based on the scheduling in the particular subchannel(s).

Any vehicle UE that intends to communicate with any pedestrian UE, for instance, when the vehicle detects a potential collision with a pedestrian 430, may page the pedestrian UE by transmitting the information in one or more subchannels of the V2P resource portion 808. The vehicle UE may determine the subchannel(s) by sensing the V2P resource portion 808 for available subchannels (e.g., subchannels not used by other vehicle UEs), and then selecting one or more of the subchannels from the available subchannels. For example, the vehicle UE may measure an energy of a subchannel in the V2P resource portion 808, and if the energy is less than a predefined threshold (indicating the subchannel is not busy), the vehicle UE may identify that subchannel as an available candidate for sending the information. The vehicle UE may then select one or more of the subchannels from the available candidates. Afterwards, the vehicle UE may encrypt paging information, SCI, or other information with an RNTI or other identifier of a target pedestrian UE, and transmit the information in one or more symbols of the selected subchannel(s) of the V2P resource portion 808. After sending the information, the vehicle UE may transmit a message to the pedestrian UE in subsequent symbols of the V2P resource portion 808 or a next V2P resource portion 808 (e.g., to request the pedestrian to move or perform another action).

Any pedestrian UE may monitor the V2P resource portion 808 for the information from any of the vehicle UEs. For example, each pedestrian UE may receive the V2P resource portion 808 and decode information from any vehicle UE received in any of the subchannels that are encrypted with the pedestrian UE's identifier (e.g., the RNTI or other identifier). If a pedestrian UE detects information from a vehicle UE in any of the subchannels that is directed to that pedestrian UE, the pedestrian UE may determine that a message may be received from the vehicle UE in the V2P resource portion 808 or another V2P resource portion 808 (e.g., based on the scheduling) and may subsequently receive the resources in the corresponding subchannel(s) of the V2P resource portion 808 for the message. The pedestrian UEs may also transmit data to the respective vehicle UEs in any subchannel of the P2V resource portion 806. Thus, each pedestrian UE may receive unicast messages from any vehicle UE in any subchannel and transmit unicast messages to any vehicle UE in any subchannel.

Accordingly, the example of FIG. 8 allows for V2P resource portions 808 to be used by vehicle UEs to page or send messages to pedestrian UEs. The illustrated example of FIG. 8 may incur less power savings for pedestrian UEs than the examples described above with respect to FIGS. 5-7, as monitoring all the subchannels of each V2P resource portion 808 may potentially use more power than monitoring only the pools of the paging indicator resources 508, 604, 704 of FIGS. 5-7, respectively. However, the example scheme of FIG. 8 saves resources since paging may be accomplished without the need for a separate, dedicated pool of resources for paging, in contrast to the examples of FIGS. 5-7.

Figure 9:
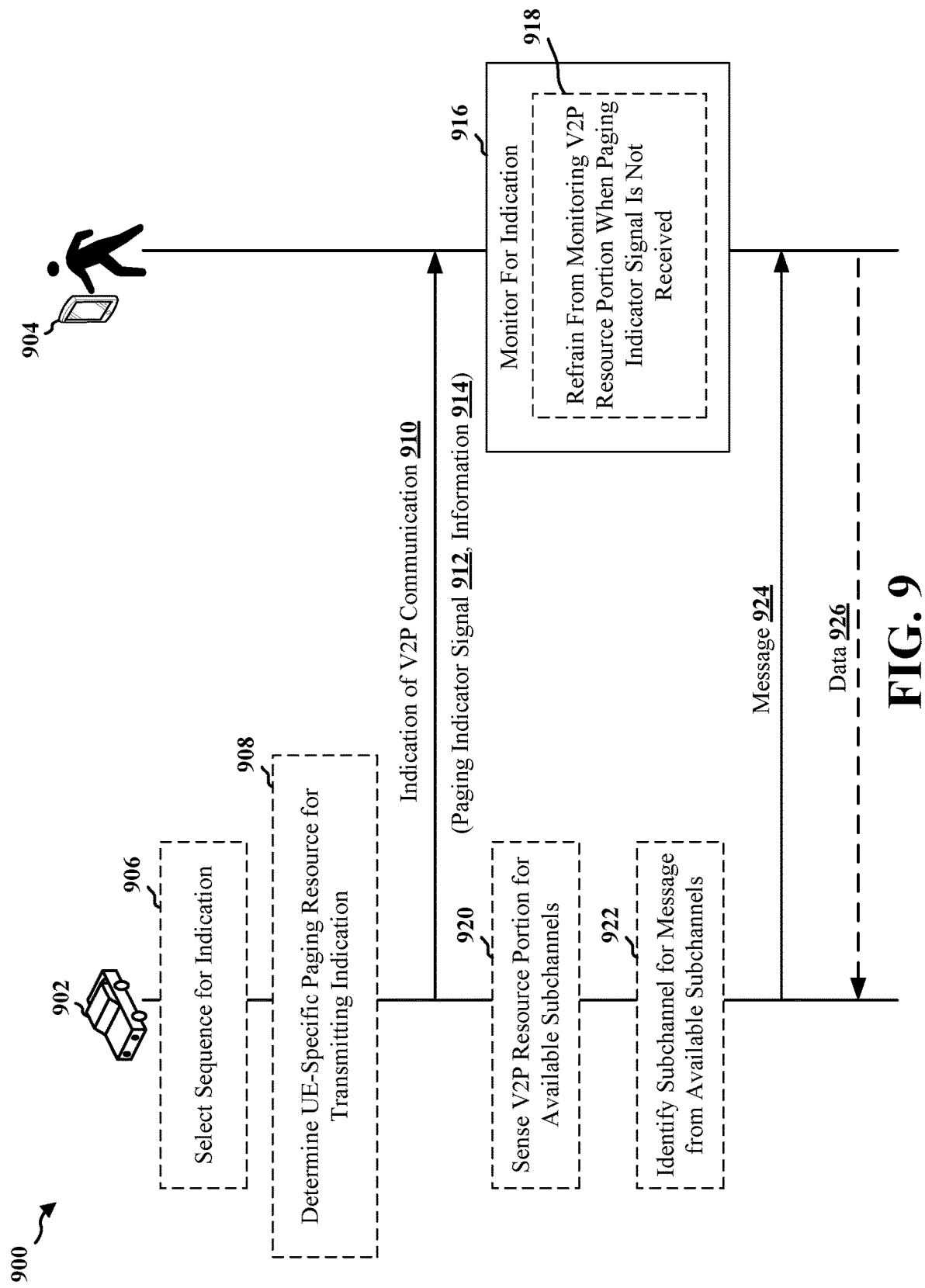
FIG. 9 is a call flow diagram of an example communication flow between a transmitting device and a receiving device.

FIG. 9 illustrates an example communication flow 900 between a transmitting device 902 and a receiving device 904, in accordance with the examples of FIGS. 5-8. The communication may be based on V2P/P2V based communication directly from a transmitting device to a receiving device. For example, the transmitting device 902 may be a vehicle UE (e.g., the vehicle UEs 402, 404, 406, 408 of FIG. 4), and the receiving device 904 may be a pedestrian UE (e.g., the pedestrian UEs 410, 412 of FIG. 4). Alternatively, the transmitting device 902 may be a pedestrian UE (e.g., the pedestrian UEs 410, 412), and the receiving device 904 may be a vehicle UE (e.g., the vehicle UEs 402, 404, 406, 408). The communication transmitting from the devices 902, 904 may be broadcast and received by multiple receiving devices within range of a particular transmitting device, as described in connection with FIG. 4. For instance, the transmitting device 902 may transmit an indication, such as a paging indicator signal, in paging indicator resources (see FIGS. 5-7), or information in a V2P resource portion (see FIG. 8) to multiple receiving devices 904.

In the illustrated example, at 906, the transmitting device 902 may select a sequence for the paging indicator signal. For example, and referring to the example of FIG. 6, the vehicle UE may select a sequence for the paging indicator signal, such as a Zadoff-Chu sequence or other sequence, which is transmitted in the pedestrian UE-specific paging resources 608, 610 in the pool of paging indicator resources 604. The sequence may be a common sequence preconfigured by the network for all vehicle UEs. Alternatively, the sequence may be a vehicle-UE specific sequence. The vehicle UE-specific sequence may be based on an identifier of the vehicle UE.

At block 908, the transmitting device 902 may determine a UE-specific paging resource associated with the transmitting device 902 for transmitting the paging indicator signal. For example, and referring to the example of FIG. 7, the vehicle UE may determine a vehicle UE-specific paging resource (e.g., the vehicle UE-specific paging resources 708, 710, 712, 714) from a pool of paging indicator resources 704. The vehicle UE may determine its vehicle UE-specific paging resource based on an identifier of the vehicle UE. For instance, and with respect to the example of FIG. 4, the first vehicle UE-specific paging resource 708 may be assigned by the network (e.g., the EPC 160 and/or the core network 190) to the first vehicle UE 402, the second vehicle UE-specific paging resource 710 may be assigned by the network to the second vehicle UE 404, the third vehicle UE-specific paging resource 712 may be assigned by the network to the third vehicle UE 406, and the fourth vehicle UE-specific paging resource 714 may be assigned by the network to the fourth vehicle UE 408. The vehicle UE-specific paging resources 708, 710, 712, 714 may be configured by the network to include different starting symbols and subchannels based on the RNTI or other identifier of the vehicle UE and/or the number of physical resource blocks in each pool of the paging indicator resources 704.

The transmitting device 902 provides an indication 910 of a V2P communication that is received by the receiving device 904 in a resource from a plurality of resources. In one example, the indication 910 may be a paging indicator signal 912. For instance, and referring to the examples of FIGS. 5-7, a vehicle UE (e.g., the vehicle UEs 402, 404, 406, 408) may transmit a plurality of resources (e.g., the resources 502, 504) to one or more pedestrian UEs (e.g., the pedestrian UEs 410, 412), including one or more pools of resources dedicated for V2P and P2V communication between vehicle UEs and pedestrian UEs. Each pool of resources may include separate resource portions for V2P/P2V communication and paging, including paging indicator resources 508, 604, 704 for pedestrian UEs to monitor paging indicator signals from vehicle UEs. In one example, the paging indicator resources 508 include a common resource pool, and the vehicle UE may page the pedestrian UE by transmitting a paging indicator signal 912 in one or more resources of the common resource pool. In another example, the paging indicator resources 604 include pedestrian UE-specific paging resources 608, 610, and the vehicle UE may page the pedestrian UE by transmitting the paging indicator signal 912 in the respective, pedestrian UE-specific paging resources 608, 610. In a further example, the paging indicator resources 704 may include vehicle UE-specific paging resources 708, 710, 712, 714, and the vehicle UE may page the pedestrian UE by transmitting the paging indicator signal 912 in its respective, vehicle UE-specific paging resource 708, 710, 712, 714.

In another example, the indication 910 may be information 914 provided to the receiving device 904 in a subchannel of a V2P resource portion. For instance, and referring to the example of FIG. 8, a vehicle UE (e.g., the vehicle UEs 402, 404, 406, 408) may transmit a plurality of resources (e.g., the resources 802, 804) to one or more pedestrian UEs (e.g., the pedestrian UEs 410, 412), including one or more pools of resources dedicated for V2P and P2V communication between vehicle UEs and pedestrian UEs. Each pool of resources may include separate resource portions for V2P/P2V communication and paging, including a P2V resource portion 806 for communication from pedestrian UEs to vehicle UEs, and a V2P resource portion 808 for communication from vehicle UEs to pedestrian UEs. The vehicle UE may send information 914 to the pedestrian UE in a subchannel of the V2P resource portion 808. As an example, the vehicle UE may transmit paging information, SCI, or other information in one or more symbols of a particular subchannel or subchannels of the V2P resource portion 808.

At 916, the receiving device 904 monitors the plurality of resources for an indication of the V2P communication from the transmitting device 902. In one example, and referring to the examples of FIGS. 5-7, the pedestrian UE may monitor the paging indicator resources 508, 604, 704 (e.g., the common resource pools, the pedestrian UE-specific paging resources 608, 610, or the vehicle UE-specific paging resources 708, 710, 712, 714) for the paging indicator signal 912 from any of the vehicle UEs. For example, each pedestrian UE may receive the paging indicator resources 508, 604, 704 and decode any paging indicator signals in common paging indicator resources that are encrypted with the pedestrian UE's identifier (e.g., the P-RNTI or other identifier), in only pedestrian UE-specific paging resources that are configured for that pedestrian UE, or by checking all possible vehicle UE-specific paging resources. If a pedestrian UE detects a paging indicator signal that is directed to that pedestrian UE from a vehicle UE in the resources, the pedestrian UE may determine that a message may be received from the vehicle UE in the V2P resource portion 510, 606, 706 and may, therefore, monitor the resources in the V2P resource portion for the message.

In another example, and referring to the example of FIG. 8, the pedestrian UE may monitor the V2P resource portion 808 for the information 914 from any of the vehicle UEs. For example, each pedestrian UE may receive the V2P resource portion 808 and decode information from any vehicle UE received in any of the subchannels that are encrypted with the pedestrian UE's identifier (e.g., the RNTI or other identifier). If a pedestrian UE detects information that is directed to that pedestrian UE from a vehicle UE in any of the subchannels, the pedestrian UE may determine that a message may be received from the vehicle UE in the V2P resource portion 808 or another V2P resource portion 808 (e.g., based on the scheduling).

During the monitoring, at 918, the receiving device 904 may refrain from monitoring the V2P resource portion for the V2P communication when the paging indicator signal is not within the paging indicator resource. For example, and referring to the examples of FIGS. 5-7, if the pedestrian UE fails to detect a paging indicator signal that is directed to that pedestrian UE from a vehicle UE in the paging indicator resources 508, 604, 704, the pedestrian UE may determine that no message will be received from the vehicle UE in the V2P resource portion 510, 606, 706 and may, therefore, refrain from monitoring the V2P resource portion for V2P communications. As an example, the pedestrian UE may sleep during the slot duration $T_{V2P}$ when a page is not received in the paging indicator resources.

At 920, the transmitting device 902 may sense the V2P resource portion for available subchannels, and at 922, the transmitting device 902 may identify the subchannel for providing the information 914 from the available subchannels. For example, and referring to the example of FIG. 8, the vehicle UE may page the pedestrian UE by transmitting the information 914 in one or more subchannels of the V2P resource portion 808. The vehicle UE may determine the subchannel(s) by sensing the V2P resource portion 808 for available subchannels (e.g., one or more subchannels not used by other vehicle UEs), and then selecting one or more of the subchannels from the available subchannels. For example, the vehicle UE may measure an energy of a subchannel in the V2P resource portion 808, and if the energy is less than a predefined threshold (indicating the subchannel is not busy), the vehicle UE may identify that subchannel as an available candidate for sending the information 914. The vehicle UE may then select one or more of the subchannels from the available candidates. Afterwards, the vehicle UE may encrypt paging information, SCI, or other information with a RNTI or other identifier of a target pedestrian UE, and transmit the information 914 in one or more symbols of the selected subchannel(s) of the V2P resource portion 808.

Finally, the transmitting device 902 transmits a message 924 to the receiving device 904 based on the indication 910, and the receiving device 904 receives the message 924 based on the indication 910. For instance, and referring to the examples of FIGS. 5-8, after sending the paging indicator signal 912 or the information 914, the vehicle UE may transmit a message to the pedestrian UE (e.g., to request the pedestrian to move or perform another action) in the V2P resource portion 510, 606, 706, 808 based on the paging indicator signal 912 or information 914. In one example, the message 924 may be transmitted and received in resources of the V2P resource portion following successful transmission and reception of the indication 910 (e.g., based on the presence of the vehicle UE and the pedestrian UE). In another example, the resources in the V2P resource portion in which the message 924 may be transmitted and received may be based on the subchannels of the P2V resources 612, 614, the identifier of the pedestrian UE, or the identifier of the vehicle UE, and may correspond to the time and frequency mapping of the pedestrian UE-specific paging resources 608, 610 or the vehicle UE-specific paging resources 708, 710, 712, 714 in which the paging indicator signal is received. In another example, pedestrian UEs may wake during the slot duration $T_{V2P}$ to receive the message 924 when a page is received in the paging indicator resource 508, 604, 704, and may otherwise sleep during the slot duration $T_{V2P}$. In a further example, and referring to the example of FIG. 8, after sending the information 914 in one or more symbols of a particular subchannel or subchannels of the V2P resource portion 808, the vehicle UE may transmit the message 924 in one or more subsequent symbols of the V2P resource portion 808 or a following V2P resource portion 808 in the particular subchannel(s). The vehicle UE may also receive data 926 transmitted from the receiving device 904 in one or more subchannels of the P2V resource portion 806, which may be identical to or different than the subchannel(s) for transmitting the message 924.

Figure 10:
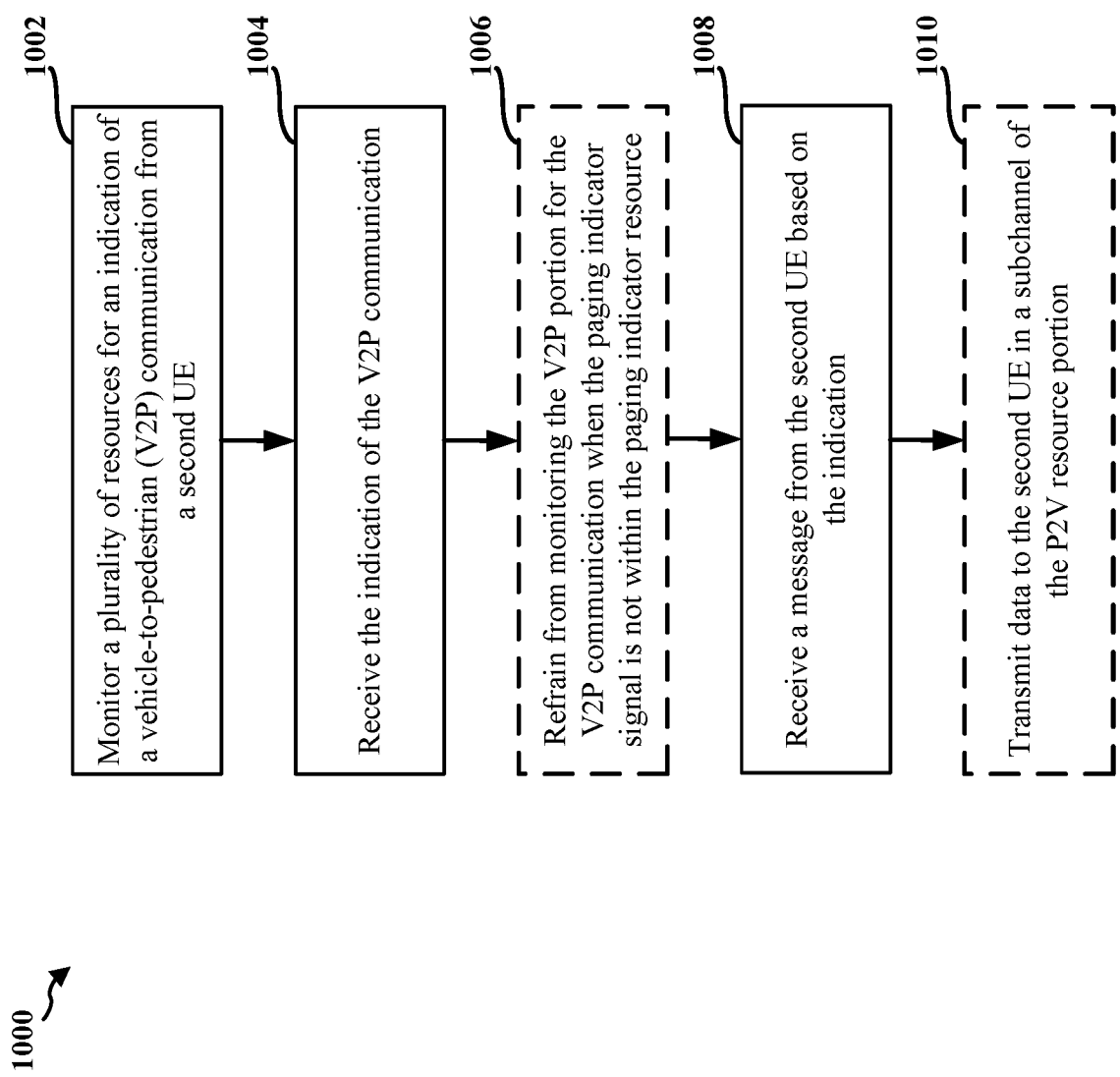
FIG. 10 is a flowchart of a method of wireless communication of a receiving UE, in accordance with the teachings disclosed herein.

FIG. 10 is a flowchart 1000 of a method of wireless communication. The method may be performed by a receiving device (e.g., the pedestrian UEs 410, 412; the apparatus 1102) in communication with a transmitting device (e.g., the vehicle UEs 402, 404, 406, 408). Optional aspects are illustrated with a dashed line. The method allows UEs to monitor pages for V2P communication with more efficient power consumption.

At 1002, the receiving device monitors a plurality of resources for an indication of a V2P communication from a second UE. For example, the monitoring of the plurality of resources for an indication of a V2P communication may be performed by an example monitor component 1140 of the apparatus 1102 of FIG. 11. The plurality of resources may be TDM with resources for non-V2P communication. For instance, and referring to the example of FIG. 9, at 916, the receiving device 904 monitors the plurality of resources (e.g., the V2P/P2V resources 502) for an indication (e.g., the indication 910) of a V2P communication from the transmitting device 902. The V2P/P2V resources 502 may include one or more pools of resources dedicated for V2P and P2V communication between vehicle UEs and pedestrian UEs. The V2P/P2V resources 502 may be TDM with the non-V2P/P2V resources 504 for non-V2P/P2V communication, as illustrated in FIGS. 5 and 8.

At 1004, the receiving device receives the indication of the V2P communication. For example, the receiving of the indication of the V2P communication may be performed by an example indication component 1142 of the apparatus 1102 of FIG. 11. The plurality of resources may each include a P2V resource portion for communication from the first UE to the second UE, and a V2P resource portion for communication from the second UE to the first UE. The P2V resource portion and the V2P resource portion may span multiple resource blocks in one or more contiguous slots. In a first aspect, the indication may comprise a paging indicator signal, and each of the plurality of resources may further include a paging indicator resource for the first UE to monitor the paging indicator signal from the second UE. The paging indicator resource may span multiple resource blocks in a slot. For example, and referring to the examples of FIGS. 5-7, the V2P/P2V resources 502 may each include a P2V resource portion 506, 602, 702 for communication from pedestrian UEs to vehicle UEs, paging indicator resources 508, 604, 704 for pedestrian UEs to monitor paging indicator signals from vehicle UEs, and a V2P resource portion 510, 606, 706 for communication from vehicle UEs to pedestrian UEs. The pedestrian UE may monitor paging indicator resources 508, 604, 704 (e.g., the common resource pools, the pedestrian UE-specific paging resources 608, 610, or the vehicle UE-specific paging resources 708, 710, 712, 714) for the paging indicator signal 912 from any of the vehicle UEs. The P2V resource portion 506, 602, 702 and V2P resource portion 510, 606, 706 may each span multiple resource blocks in one or more contiguous slots (e.g., the RBs and slots in examples 200, 210 of FIG. 2). Similarly, the paging indicator resources 508, 604, 704 may span multiple resource blocks in one or more slots.

In one example, the paging indicator resource may comprise a common resource pool configured for multiple UEs. For example, and referring to the example of FIG. 5, the paging indicator resources 508 include a common resource pool for vehicle UEs to page all pedestrian UEs within range (e.g., the range 401 of FIG. 4) of the vehicle UE. The common resource pool may be preconfigured by the network (e.g., by the EPC 160 and/or the core network 190) for all pedestrian UEs 410, 412. Any vehicle UE that intends to communicate with any pedestrian UE, for instance, when the vehicle is in a collision course with a pedestrian 430, may page the pedestrian UE by transmitting a paging indicator signal in one or more resources of the common resource pool.

The paging indicator signal may include a preconfigured sequence, and the pedestrian UE may monitor for the preconfigured sequence across one or more resource blocks in a slot. For example, and referring to the example of FIG. 5, the paging indicator signal may include a common sequence, such as a Zadoff-Chu sequence or other sequence, which is transmitted in the slot(s) of paging indicator resources 508 across one or more RBs. The common sequence may be preconfigured by the network for all vehicle UEs. Thus, any vehicle UE may use the same preconfigured sequence when paging any pedestrian UE in the common paging indicator resources.

The paging indicator resource and the paging indicator signal may be based on a location of the first UE and the second UE. For example, and referring to the example of FIG. 5, the paging indicator signal and/or the common paging indicator resources may also be dependent on a location (e.g., geography or zone) of the paging vehicle UE and the paged pedestrian UE. For instance, and referring to the example of FIG. 4, if the fourth vehicle UE 408 is within one region and the other vehicle UEs 402, 404, 406 are within a different region, the network may configure the paging indicator resources for the fourth UE 408 to be different than the common paging resources for the other UEs 402, 404, 406 (e.g., in duration, number of RBs, periodicity, etc.).

In another example, the paging indicator resource may include a UE-specific paging resource associated with the first UE for monitoring the paging indicator signal. The paging indicator resource may span one or more resource blocks. For example, and referring to the example of FIG. 6, the paging indicator resources 604 include pedestrian UE-specific paging resources 608, 610 for vehicle UEs to page particular pedestrian UEs within a range (e.g., the range 401) of the vehicle UE. For instance, and referring to the example of FIG. 4, the first pedestrian UE-specific paging resource 608 may be assigned by the network to the first pedestrian UE 410 (e.g., P-UE 1), while the second pedestrian UE-specific paging resource 610 may be assigned by the network to the second pedestrian UE 412 (e.g., P-UE 2). Any vehicle UE who intends to communicate with a particular pedestrian UE (e.g., the pedestrian UEs 410, 412), for instance, when the vehicle is in a collision course with a pedestrian 430, may page the pedestrian UE by transmitting a paging indicator signal in the respective, pedestrian UE-specific paging resource 608, 610. The paging indicator resources 604 may span one or more resource blocks in one or more slots.

The UE-specific paging resource may be based on one of a resource associated with the first UE for communicating with the second UE in the P2V resource portion, or an identifier of the first UE. For example, the UE-specific paging resource may be based on a subchannel used for communicating with the second UE in the P2V resource portion. Alternatively, the UE-specific paging resource may be based on the identifier of the first UE and a number of available or allocated resource blocks in the paging indicator resource. For instance, and referring to the example of FIG. 6, the pedestrian UE-specific paging resources 608, 610 may be based on the P2V resources 612, 614 in which the pedestrian UEs 410, 412 transmit data to the vehicle UEs. For example, as illustrated in FIG. 6, the pedestrian UE-specific paging resources 608, 610 may be configured by the network (e.g., by the EPC 160 and/or the core network 190) or selected by respective pedestrian UEs to include the same subchannel(s) or subcarrier(s) as the P2V resources 612, 614. The pedestrian UE-specific paging resources 608, 610 may also be based on an identifier of the pedestrian UE. For example, the pedestrian UE-specific paging resources 608, 610 may be configured by the network or selected by respective pedestrian UEs to include different starting symbols and subchannels based on the P-RNTI or other identifier of the pedestrian UE and/or the number of physical resource blocks in each pool of paging indicator resources 604 (e.g., such as that calculated using Equation 1 above).

The paging indicator signal may comprise one of a common sequence for multiple UEs or a UE-specific sequence for the second UE. The UE-specific sequence may be based on an identifier of the second UE and an available number of paging indication sequences allocated to be paged for the second UE. For example, and referring to the example of FIG. 6, the vehicle UE may select a sequence for the paging indicator signal, such as a Zadoff-Chu sequence or other sequence, which is transmitted in the pedestrian UE-specific paging resources 608, 610 in the pool of paging indicator resources 604. The sequence may be a common sequence preconfigured by the network for all vehicle UEs. Thus, any vehicle UE may select to use the same preconfigured sequence when paging respective pedestrian UEs in the pedestrian UE-specific paging resources 608, 610. Alternatively, the sequence may be a vehicle UE-specific sequence. The vehicle UE-specific sequence may be based on an identifier of the vehicle UE. For example, the vehicle UE-specific sequence may be configured by the network or selected by respective vehicle UEs based on the RNTI or other identifier of the vehicle UE and/or the number of paging indication sequences for the vehicle UE (e.g., such as that calculated using Equation 2 above).

In another example, the paging indicator resource may include a UE-specific paging resource associated with the second UE for monitoring the paging indicator signal. The paging indicator resource may include additional UE-specific paging resources assigned to additional UEs. For example, and referring to the example of FIG. 7, the paging indicator resources 704 may include vehicle UE-specific paging resources 708, 710, 712, 714 for vehicle UEs to page any pedestrian UEs within a range (e.g., the range 401) of the vehicle UEs. For instance, and referring to the example of FIG. 4, the first vehicle UE-specific paging resource 708 may be assigned by the network (e.g., by the EPC 160 and/or the core network 190) to the first vehicle UE 402 (e.g., V-UE 1), the second vehicle UE-specific paging resource 710 may be assigned by the network to the second vehicle UE 404, the third vehicle UE-specific paging resource 712 may be assigned by the network to the third vehicle UE 406, and the fourth vehicle UE-specific paging resource 714 may be assigned by the network to the fourth vehicle UE 408. Each vehicle UE that intends to communicate with pedestrian UEs (e.g., the pedestrian UE 410, 412), for instance, when the vehicle is in a collision course with a pedestrian 430, may page the pedestrian UE by transmitting a paging indicator signal in its respective, vehicle UE-specific paging resource 708, 710, 712, 714.

The UE-specific paging resource may be based on an identifier of the second UE and a number of available paging resource blocks in the paging indicator resource. For example, and referring to the example of FIG. 7, the vehicle UE-specific paging resources 708, 710, 712, 714 may be selected by respective vehicle UEs (or configured by the network) to include different starting symbols and subchannels based on the RNTI or other identifier of the vehicle UE and/or the number of physical resource blocks in each pool of paging indicator resources 704 (e.g., such as that calculated based on Equation 3 above).

The message may be received in one or more resources associated with the second UE in the V2P resource portion based on whether the paging indicator signal is received in the UE-specific paging resource. For example, and referring to the example of FIG. 7, if a pedestrian UE detects a paging indicator signal directed to it from a vehicle UE in a respective vehicle UE-specific paging resource 708, 710, 712, 714, the pedestrian UE may determine that a message may be received from the vehicle UE in corresponding resources of the V2P resource portion 706 and may monitor the corresponding resources in the V2P resource portion for the message. The monitored resources in the V2P resource portion 706 may be based on the identifier of the vehicle UE, for example, and may similarly correspond to the time and frequency mapping of the vehicle UE-specific paging resources 708, 710, 712, 714 in which the paging indicator signal is received.

In a second aspect, the indication may comprise information from the second UE in a subchannel of the V2P resource portion. The V2P resource portion may comprise a subchannel size that spans multiple slots. For example, and referring to the example of FIG. 8, and unlike the examples of FIGS. 5-7, the V2P/P2V resources 802 of FIG. 8 do not include paging indicator resources 508, 604, 704 for pedestrian UEs to monitor paging indicator signals from vehicle UEs. Rather, different vehicle UEs may send information to the pedestrian UEs in different subchannels of the V2P resource portion 808, and the vehicle UEs may transmit and the pedestrian UEs may receive unicast messages based on the information. In one example, any vehicle UE may transmit paging information, SCI, or other information in one or more symbols of a particular subchannel or subchannels of the V2P resource portion 808, and any pedestrian UE may monitor the different subchannels for the information. The P2V resource portion 806 and the V2P resource portion 808 may each have a subchannel size spanning multiple resource blocks and multiple slots (e.g., the RBs and slots in examples 200, 210 of FIG. 2).

The message may comprise a unicast message received from the second UE in the subchannel based on the indication. Additional unicast messages may be received from other UEs in additional subchannels of the V2P resource portion, and the subchannel and additional subchannels may be decoded for the unicast message from the second UE. For example, and referring to the example of FIG. 8, each pedestrian UE may receive the V2P resource portion 808 and decode information from any vehicle UE received in any of the subchannels that are encrypted with the pedestrian UE's identifier (e.g., the RNTI or other identifier). If a pedestrian UE detects information that is directed to that pedestrian UE from a vehicle UE in any of the subchannels, the pedestrian UE may determine that a message may be received from the vehicle UE in the V2P resource portion 808 or another V2P resource portion 808 (e.g., based on the scheduling) and may subsequently receive the resources in the corresponding subchannel(s) of the V2P resource portion for the message. Thus, each pedestrian UE may receive unicast messages from any vehicle UE in any subchannel.

At 1006, the receiving device may refrain from monitoring the V2P resource portion for the V2P communication when the paging indicator signal is not within the paging indicator resource. For example, the refraining from monitoring of the V2P resource portion may be performed by an example refrain component 1144 of the apparatus 1102 of FIG. 11. For instance, and referring to the example of FIG. 9, at 918, the receiving device 904 may refrain from monitoring the V2P resource portion for the V2P communication when the paging indicator signal is not within the paging indicator resource. For example, and referring to the examples of FIGS. 5-7, if the pedestrian UE fails to detect a paging indicator signal that is directed to that pedestrian UE from a vehicle UE in the paging indicator resources 508, 604, 704, the pedestrian UE may determine that no message may be received from the vehicle UE in the V2P resource portion 510, 606, 706 and may therefore refrain from monitoring the V2P resource portion for V2P communications. As an example, the pedestrian UE may sleep during the slot duration $T_{V2P}$ when a page is not received in paging indicator resource.

At 1008, the receiving device receives a message from the second UE based on the indication. For example, the receiving of the message from the second UE based on the indication may be performed by an example message component 1146 of the apparatus 1102 of FIG. 11. For instance, and referring to the example of FIG. 9, the transmitting device 902 transmits a message 924 to the receiving device 904 based on the indication 910, and the receiving device 904 receives the message 924 based on the indication 910. For example, and referring to the examples of FIGS. 5-8, after receiving the paging indicator signal 912 or the information 914, the pedestrian UE may receive a message from the vehicle UE (e.g., to request the pedestrian to move or perform another action) in the V2P resource portion 510, 606, 706, 808 based on the paging indicator signal 912 or the information 914.

Finally, at 1010, the receiving device may transmit data to the second UE in a subchannel of the P2V resource portion. For example, the transmitting of the data to the second UE may be performed by an example data component 1148 of the apparatus 1102 of FIG. 11. For instance, and referring to the example of FIG. 9, the pedestrian UE may transmit data 926 to the vehicle UE in one or more subchannels of the P2V resource portion 806, which may be identical to or different than the subchannel(s) for receiving the message 924.

Figure 11:
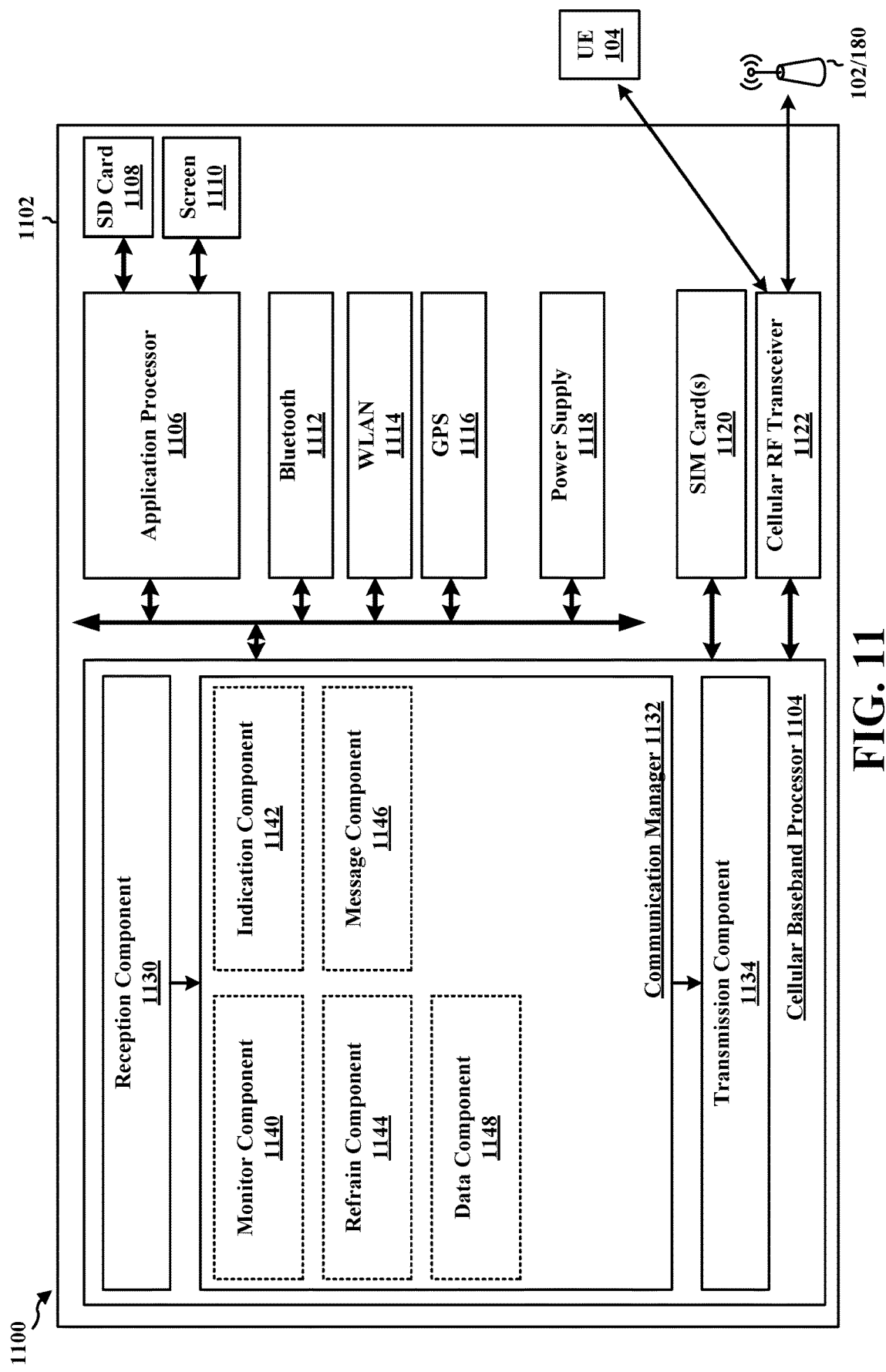
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 may be a receiving device (e.g., the pedestrian UEs 410, 412, and/or the receiving device 904). The apparatus 1102 includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see the device 350 of FIG. 3) and include the aforediscussed additional modules of the apparatus 1102.

The communication manager 1132 includes a monitor component 1140 that is configured to monitor a plurality of resources (e.g., received via the reception component 1130) for an indication of a vehicle-to-pedestrian (V2P) communication from a second UE, e.g., as described in connection with 1002 of FIG. 10. The communication manager 1132 further includes an indication component 1142 that is configured to receive the indication of the V2P communication, e.g., as described in connection with 1004 of FIG. 10. The communication manager 1132 may further include a refrain component 1144 that is configured to refrain from monitoring the V2P resource portion for the V2P communication when the paging indicator signal is not within the paging indicator resource, e.g., as described in connection with 1006 of FIG. 10. The communication manager 1132 further includes a message component 1146 that is configured to receive a message from the second UE (e.g., via the reception component 1130) based on the indication, e.g., as described in connection with 1008 of FIG. 10. The communication manager 1132 may further include a data component 1148 that is configured to transmit data to the second UE in a subchannel of the P2V resource portion (e.g., via the transmission component 1134), e.g., as described in connection with 1010 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for monitoring a plurality of resources for an indication of a V2P communication from a second UE. The example apparatus 1102 also includes means for receiving the indication of the V2P communication. The example apparatus 1102 also includes means for receiving a message from the second UE based on the indication. In another configuration, the apparatus 1102 may include means for refraining from monitoring the V2P resource portion for the V2P communication when the paging indicator signal is not within the paging indicator resource. In another configuration, the apparatus 1102 may include means for transmitting data to the second UE in a subchannel of the P2V resource portion.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX processor 368, the RX processor 356, and the controller/processor 359 configured to perform the functions recited by the aforementioned means.

Figure 12:
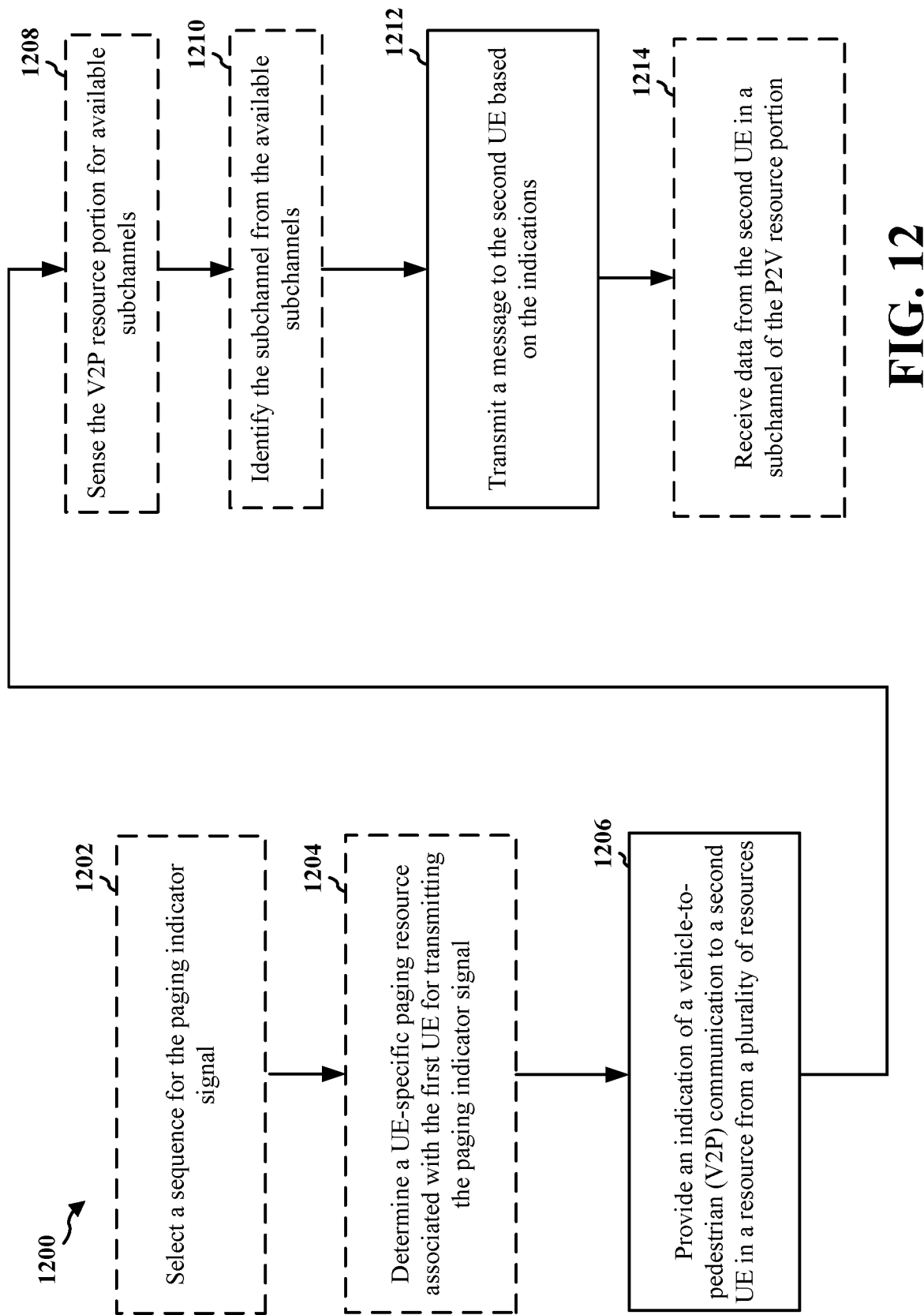
FIG. 12 is a flowchart of a method of wireless communication of a transmitting UE, in accordance with the teachings disclosed herein.

FIG. 12 is a flowchart 1200 of a method of wireless communication. The method may be performed by a transmitting device (e.g., the vehicle UEs 402, 404, 406, 408, and/or the transmitting device 902; the apparatus 1302 of FIG. 13) in communication with a receiving device (e.g., the pedestrian UEs 410, 412, and/or the receiving device 904). Optional aspects are illustrated with a dashed line. The method allows vehicle UEs to efficiently page pedestrian UEs in V2P communication.

At 1202, the transmitting device may select a sequence for the paging indicator signal, where the sequence comprises one of a common sequence for multiple UEs or a UE-specific sequence for the first UE. For example, the selecting of the sequent for the paging indicator signal may be performed by an example sequence component 1340 of the apparatus 1302 of FIG. 13. For example, and referring to the example of FIG. 9, at 906, the transmitting device 902 may select a sequence for the paging indicator signal. Moreover, and referring to the example of FIG. 6, the vehicle UE may select a sequence for the paging indicator signal, such as a Zadoff-Chu sequence or other sequence, which is transmitted in the pedestrian UE-specific paging resources 608, 610 in the pool of paging indicator resources 604. The sequence may be a common sequence preconfigured by the network for all vehicle UEs. Alternatively, the sequence may be a vehicle-UE specific sequence.

The UE-specific sequence may be based on an identifier of the first UE and a number of paging indication sequences for the first UE. For example, the vehicle UE-specific sequence may be configured by the network or selected by respective vehicle UEs based on the RNTI or other identifier of the vehicle UE and/or the number of paging indication sequences for the vehicle UE (e.g., such as that calculated using Equation 2 above).

At 1204, the transmitting device may determine a UE-specific paging resource associated with the first UE for transmitting the paging indicator signal, where the paging indicator resource includes the UE-specific paging resource. For example, the determining of the UE-specific paging resource may be performed by an example resource component 1342 of the apparatus 1302 of FIG. 13. For instance, and referring to the example of FIG. 9, at 908, the transmitting device 902 may determine a UE-specific paging resource associated with the transmitting device 902 for transmitting the paging indicator signal. For example, and referring to the example of FIG. 7, the vehicle UE may determine a vehicle UE-specific paging resource (e.g., the vehicle UE-specific paging resources 708, 710, 712, 714) from a pool of paging indicator resources 704.

The UE-specific paging resource may be based on an identifier of the first UE and an available number of resource blocks in the paging indicator resource. For example, and referring to the example of FIG. 7, the vehicle UE-specific paging resources 708, 710, 712, 714 may be selected by respective vehicle UEs (or configured by the network) to include different starting symbols and subchannels based on the RNTI or other identifier of the vehicle UE and/or the number of physical resource blocks in each pool of paging indicator resources 704 (e.g., such as that calculated based on Equation 3 above).

At 1206, the transmitting device provides an indication of a V2P communication to a second UE in a resource from a plurality of resources. For example, the providing of the indication of the V2P communication may be performed by an example indication component 1344 of the apparatus 1302 of FIG. 13. The plurality of resources may be TDM with resources for non-V2P communication. For instance, and referring to the example of FIG. 9, the transmitting device 902 provides an indication 910 of a V2P communication to the receiving device 904 in a resource from a plurality of resources (e.g., the V2P/P2V resources 502). The V2P/P2V resources 502 may include one or more pools of resources dedicated for V2P and P2V communication between vehicle UEs and pedestrian UEs. The V2P/P2V resources 502 may be TDM with non-V2P/P2V resources 504 for non-V2P/P2V communication, as illustrated in FIGS. 5 and 8.

The plurality of resources may each include a P2V resource portion for communication from the second UE to the first UE, and a V2P resource portion for communication from the first UE to the second UE. The P2V resource portion and the V2P resource portion may span multiple resource blocks in one or more contiguous slots. In a first aspect, the indication may comprise a paging indicator signal, and each of the plurality of resources may further include a paging indicator resource for the first UE to transmit the paging indicator signal to the second UE. The paging indicator resource may span multiple resource blocks in a slot. For example, and referring to the examples of FIGS. 5-7, the V2P/P2V resources 502 may each include a P2V resource portion 506, 602, 702 for communication from pedestrian UEs to vehicle UEs, paging indicator resources 508, 604, 704 for vehicle UEs to transmit paging indicator signals to pedestrian UEs, and a V2P resource portion 510, 606, 706 for communication from vehicle UEs to pedestrian UEs. The vehicle UE may transmit the paging indicator signal 912 in paging indicator resources 508, 604, 704 (e.g., the common resource pools, the pedestrian UE-specific paging resources 608, 610, or the vehicle UE-specific paging resources 708, 710, 712, 714) to any of the pedestrian UEs. The P2V resource portion 506, 602, 702 and the V2P resource portion 510, 606, 706 may each span multiple resource blocks in one or more contiguous slots (e.g., the RBs and slots in examples 200, 210 of FIG. 2). Similarly, the paging indicator resources 508, 604, 704 may span multiple resource blocks in one or more slots.

In one example, the paging indicator resource may comprise a common resource pool for multiple UEs. For example, and referring to the example of FIG. 5, the paging indicator resources 508 includes a common resource pool for vehicle UEs to page all pedestrian UEs within a range (e.g., the range 401) of the vehicle UE. The common resource pool may be preconfigured by the network (e.g., by the EPC 160 and/or the core network 190) for all pedestrian UEs 410, 412. Any vehicle UE that intends to communicate with any pedestrian, for instance, when the vehicle is in a collision course with a pedestrian 430, may page the pedestrian UE by transmitting a paging indicator signal in one or more resources of the common resource pool.

The paging indicator signal may include a preconfigured sequence, and the preconfigured sequence may be transmitted across one or more resource blocks in a slot. For example, and referring to the example of FIG. 5, the paging indicator signal may include a common sequence, such as a Zadoff-Chu sequence or other sequence, which is transmitted in the slot(s) of the paging indicator resources 508 across one or more RBs. The common sequence may be preconfigured by the network for all vehicle UEs. Thus, any vehicle UE may use the same preconfigured sequence when paging any pedestrian UE in the common paging indicator resources.

The paging indicator resource and the paging indicator signal may be based on a location of the first UE and the second UE. For example, and referring to the example of FIG. 5, the paging indicator signal and/or the common paging indicator resources may also be dependent on a location (e.g., geography or zone) of the paging vehicle UE and the paged pedestrian UE. For instance, and referring to the example of FIG. 4, if the fourth vehicle UE 408 is in one region and the other vehicle UEs 402, 404, 406 are within a different region, the network may configure the paging indicator resources for the fourth vehicle UE 408 to be different than the common paging resources for the other vehicle UEs 402, 404, 406 (e.g., in duration, number of RBs, periodicity, etc.).

In another example, the paging indicator resource may include a UE-specific paging resource associated with the second UE for transmitting the paging indicator signal. The paging indicator resource may span one or more resource blocks of a preconfigured size. For example, and referring to the example of FIG. 6, the paging indicator resources 604 include pedestrian UE-specific paging resources 608, 610 for vehicle UEs to page particular pedestrian UEs within a range (e.g., the range 401) of the vehicle UE. For instance, and referring to the example of FIG. 4, the first pedestrian UE-specific paging resource 608 may be assigned by the network to the first pedestrian UE 410 (e.g., P-UE 1), while the second pedestrian UE-specific paging resource 610 may be assigned by the network to the second pedestrian UE 412 (e.g., P-UE 2). Any vehicle UE that intends to communicate with a particular pedestrian (e.g., the pedestrian UEs 410, 412), for instance, when the vehicle is in a collision course with a pedestrian 430, may page the pedestrian UE by transmitting a paging indicator signal in the respective, pedestrian UE-specific paging resource 608, 610. The paging indicator resources 604 may span one or more resource blocks in one or more slots.

The UE-specific paging resource may be based on one of a resource associated with the second UE for communicating with the first UE in the P2V resource portion, or an identifier of the second UE. For example, the UE-specific paging resource may be based on a subchannel used for communications of the second UE in the P2V resource portion. Alternatively, the UE-specific paging resource may be based on the identifier of the second UE and an available number of resource blocks in the paging indicator resource. For instance, and referring to the example of FIG. 6, the pedestrian UE-specific paging resources 608, 610 may be based on the P2V resources 612, 614 in which the pedestrian UEs 410, 412 transmit data to the vehicle UEs. For example, as illustrated in FIG. 6, the pedestrian UE-specific paging resources 608, 610 may be configured by the network (e.g., by the EPC 160 and/or the core network 190) or selected by respective pedestrian UEs to include the same subchannel(s) or subcarrier(s) as the P2V resources 612, 614. The pedestrian UE-specific paging resources 608, 610 may also be based on an identifier of the pedestrian UE. For example, the pedestrian UE-specific paging resources 608, 610 may be configured by the network or selected by respective pedestrian UEs to include different starting symbols and subchannels based on the P-RNTI or other identifier of the pedestrian UE and/or the number of physical resource blocks in each pool of paging indicator resources 604 (e.g., such as that calculated using Equation 1 above).

In a second aspect, the indication may comprise information provided to the second UE in a subchannel of the V2P resource portion. The V2P resource portion may comprise a subchannel size that spans multiple slots. For example, and referring to the example of FIG. 8, unlike the examples of FIGS. 5-7, the V2P/P2V resources 802 of FIG. 8 do not include paging indicator resources 508, 604, 704 for pedestrian UEs to monitor paging indicator signals from vehicle UEs. Rather, different vehicle UEs may send information to the pedestrian UEs in different subchannels of the V2P resource portion 808, and the vehicle UEs may transmit and the pedestrian UEs may receive unicast messages based on the information. In one example, any vehicle UE may transmit paging information, SCI, or other information in one or more symbols of a particular subchannel or subchannels of the V2P resource portion 808, and any pedestrian UE may monitor the different subchannels for the information. The P2V resource portion 806 and the V2P resource portion 808 may each have a subchannel size spanning multiple resource blocks and multiple slots (e.g., the RBs and slots in examples 200, 210 of FIG. 2).

The message may comprise a unicast message transmitted to the second UE in the subchannel based on the indication. For example, and referring to the example of FIG. 8, each vehicle UE may transmit information in any of the subchannels of the V2P resource portion 808 to be decoded by a particular pedestrian UE and scheduling an upcoming unicast message. The vehicle UE may then transmit a message to the pedestrian UE in corresponding subchannel(s) and subsequent symbols of the V2P resource portion 808 or another V2P resource portion 808 (e.g., based on the scheduling). Thus, each vehicle UE may transmit unicast messages to any pedestrian UE in any subchannel.

At 1208, the transmitting device may sense the V2P resource portion for available subchannels, and at 1210, the transmitting device may identify the subchannel from the available subchannels. For example, the sensing of the V2P resource portion may be performed by an example sense component 1346 of the apparatus 1302 of FIG. 13. The identifying of the subchannel from the available subchannels may be performed by an example identification component 1348 of the apparatus 1302 of FIG. 13. For example, and referring to the example of FIG. 9, at 920, the transmitting device 902 may sense the V2P resource portion for available subchannels, and at 922, the transmitting device 902 may identify the subchannel for providing the information 914 from the available subchannels.

At 1212, the transmitting device transmits a message to the second UE based on the indication. For example, the transmitting of the message to the second UE based on the indication may be performed by an example message component 1350 of the apparatus 1302 of FIG. 13. For instance, and referring to the example of FIG. 9, the transmitting device 902 transmits a message 924 to the receiving device 904 based on the indication 910. For instance, and referring to the examples of FIGS. 5-8, after sending the paging indicator signal 912 or the information 914, the vehicle UE may transmit a message to the pedestrian UE (e.g., to request the pedestrian to move or perform another action) in the V2P resource portion 510, 606, 706, 808 based on the paging indicator signal 912 or the information 914.

Finally, at 1214, the transmitting device may receive data from the second UE in a subchannel of the P2V resource portion. For example, the receiving of the data from the second UE may be performed by an example data component 1352 of the apparatus 1302 of FIG. 13. For instance, and referring to the example of FIG. 9, the transmitting device 902 may receive data 926 transmitted from the receiving device 904 in one or more subchannels of the P2V resource portion 806, which may be identical to or different than the subchannel(s) for transmitting the message 924.

Figure 13:
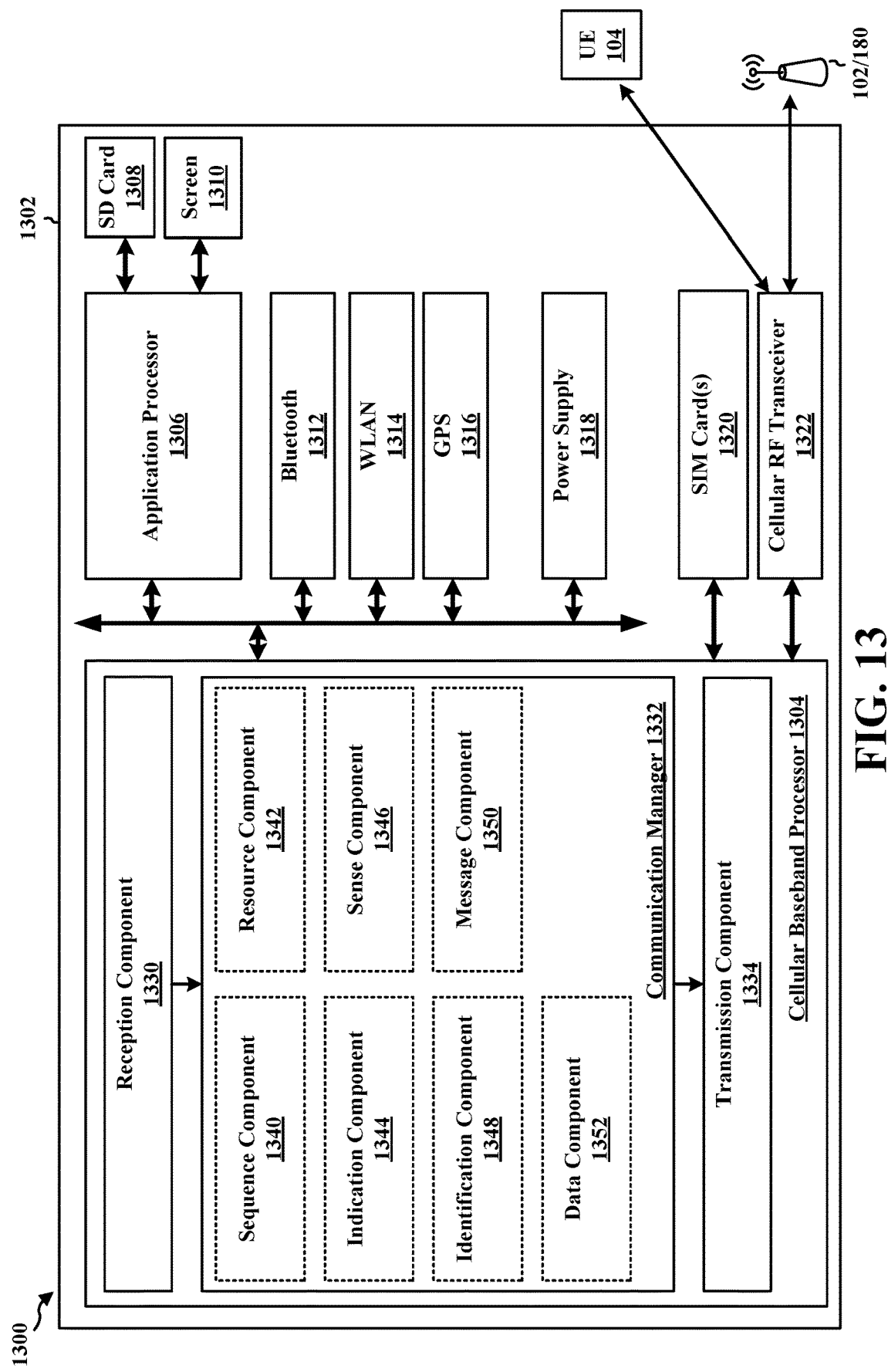
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may be a transmitting device (e.g., the vehicle UEs 402, 404, 406, 408, and/or the transmitting device 902. The apparatus 1302 includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see the device 350 of FIG. 3) and include the aforediscussed additional modules of the apparatus 1302.

The communication manager 1332 includes a sequence component 1340 that is configured to select a sequence for the paging indicator signal, e.g., as described in connection with 1202 of FIG. 12. The sequence may comprise one of a common sequence for multiple UEs or a UE-specific sequence for the first UE. The communication manager 1332 further includes a resource component 1342 that is configured to determine a UE-specific paging resource associated with the first UE for transmitting the paging indicator signal, e.g., as described in connection with 1204 of FIG. 12. The paging indicator resource includes the UE-specific paging resource. The communication manager 1332 further includes an indication component 1344 that is configured to provide an indication via a transmission component 1334 of a V2P communication to a second UE in a resource from a plurality of resources, e.g., as described in connection with 1206 of FIG. 12. The resource may be, for example, the UE-specific paging resources from the resource component 1342. The communication manager 1332 further includes a sense component 1346 that is configured to sense the V2P resource portion for available subchannels, e.g., as described in connection with 1208 of FIG. 12. The communication manager 1332 further includes an identification component 1348 that is configured to identify the subchannel from the available subchannels, e.g., as described in connection with 1210 of FIG. 12. The indication provided by the indication component 1344 may be transmitted in the identified subchannel to the second UE. The communication manager 1332 further includes a message component 1350 that is configured to transmit a message to the second UE (e.g., via the transmission component 1334) based on the indication from the indication component 1348, e.g., as described in connection with 1212 of FIG. 12. The communication manager 1332 further includes a data component 1352 that is configured to receive data (e.g., via the reception component 1330) from the second UE in a subchannel of the P2V resource portion, e.g., as described in connection with 1214 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for providing an indication of a V2P communication to a second UE in a resource from a plurality of resources. The example apparatus 1302 also includes means for transmitting a message to the second UE based on the indication. In another configuration, the apparatus 1302 may include means for selecting a sequence for the paging indicator signal, where the sequence comprises one of a common sequence for multiple UEs or a UE-specific sequence for the first UE. In another configuration, the apparatus 1302 may include means for determining a UE-specific paging resource associated with the first UE for transmitting the paging indicator signal, where the paging indicator resource includes the UE-specific paging resource. In another configuration, the apparatus 1302 may include means for receiving data from the second UE in a subchannel of the P2V resource portion. In another configuration, the apparatus 1302 may include means for sensing the V2P resource portion for available subchannels. The example apparatus 1302 may also include means for identifying the subchannel from the available subchannels.

The aforementioned means may be one or more of the aforementioned components of the apparatus 1302 configured to perform the functions recited by the aforementioned means. As described supra, the apparatus 1302 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE, comprising: monitoring a plurality of resources for an indication of a V2P communication from a second UE; receiving the indication of the V2P communication; and receiving a message from the second UE based on the indication.

In aspect 2, the method of aspect 1 further includes that the plurality of resources are TDM with resources for non-V2P communication.

In aspect 3, the method of any of aspect 1 or aspect 2 further includes that the plurality of resources each include a P2V resource portion for communication from the first UE to the second UE, and a V2P resource portion for communication from the second UE to the first UE.

In aspect 4, the method of any of aspects 1 to 3 further includes that the indication comprises a paging indicator signal, and wherein each of the plurality of resources further includes a paging indicator resource for the first UE to monitor the paging indicator signal from the second UE.

In aspect 5, the method of any of aspects 1 to 4 further includes: refraining from monitoring the V2P resource portion for the V2P communication when the paging indicator signal is not within the paging indicator resource.

In aspect 6, the method of any of aspects 1 to 5 further includes that the paging indicator resource comprises a common resource pool configured for multiple UEs.

In aspect 7, the method of any of aspects 1 to 6 further includes that the paging indicator resource spans multiple resource blocks in a slot.

In aspect 8, the method of any of aspects 1 to 7 further includes that the paging indicator signal includes a preconfigured sequence, and the preconfigured sequence is monitored across one or more resource blocks in a slot.

In aspect 9, the method of any of aspects 1 to 8 further includes that the paging indicator resource and the paging indicator signal are based on a location of the first UE and the second UE.

In aspect 10, the method of any of aspects 1 to 9 further includes that the P2V resource portion and the V2P resource portion span multiple resource blocks in one or more contiguous slots.

In aspect 11, the method of any of aspects 1 to 10 further includes that the paging indicator resource includes a UE-specific paging resource associated with the first UE for monitoring the paging indicator signal.

In aspect 12, the method of any of aspects 1 to 11 further includes that the UE-specific paging resource is based on one of a resource associated with the first UE for communicating with the second UE in the P2V resource portion, or an identifier of the first UE.

In aspect 13, the method of any of aspects 1 to 12 further includes that the UE-specific paging resource is based on the identifier of the first UE and a number of available or allocated resource blocks in the paging indicator resource.

In aspect 14, the method of any of aspects 1 to 13 further includes that the UE-specific paging resource is based on a subchannel used for communicating with the second UE in the P2V resource portion.

In aspect 15, the method of any of aspects 1 to 14 further includes that the paging indicator resource spans one or more resource blocks.

In aspect 16, the method of any of aspects 1 to 15 further includes that the paging indicator signal comprises one of a common sequence for multiple UEs or a UE-specific sequence for the second UE.

In aspect 17, the method of any of aspects 1 to 16 further includes that the UE-specific sequence is based on an identifier of the second UE and an available number of paging indication sequences allocated to be paged for the second UE.

In aspect 18, the method of any of aspects 1 to 17 further includes that the paging indicator resource includes a UE-specific paging resource associated with the second UE for monitoring the paging indicator signal.

In aspect 19, the method of any of aspects 1 to 18 further includes that the UE-specific paging resource is based on an identifier of the second UE and a number of available paging resource blocks in the paging indicator resource.

In aspect 20, the method of any of aspects 1 to 19 further includes that the paging indicator resource includes additional UE-specific paging resources assigned to additional UEs.

In aspect 21, the method of any of aspects 1 to 20 further includes that the message is received in one or more resources associated with the second UE in the V2P resource portion based on whether the paging indicator signal is received in the UE-specific paging resource.

In aspect 22, the method of any of aspects 1 to 21 further includes that the indication comprises information from the second UE in a subchannel of the V2P resource portion.

In aspect 23, the method of any of aspects 1 to 22 further includes: transmitting data to the second UE in a subchannel of the P2V resource portion.

In aspect 24, the method of any of aspects 1 to 23 further includes that the message comprises a unicast message received from the second UE in the subchannel based on the indication.

In aspect 25, the method of any of aspects 1 to 24 further includes that additional unicast messages are received from other UEs in additional subchannels of the V2P resource portion, and wherein the subchannel and additional subchannels are decoded for the unicast message from the second UE.

In aspect 26, the method of any of aspects 1 to 25 further includes that the V2P resource portion comprises a subchannel size that spans multiple slots.

Aspect 27 is a device including one or more processors and one or more memories in electronic communication with the one or more processors storing instructions executable by the one or more processors to cause the device to implement a method as in any of aspects 1 to 26.

Aspect 28 is a system or apparatus including means for implementing a method or realizing an apparatus as in any of aspects 1 to 26.

Aspect 29 is a non-transitory computer readable medium storing instructions executable by one or more processors to cause the one or more processors to implement a method as in any of aspects 1 to 26.

Aspect 30 is a method of wireless communication at a first UE, comprising: providing an indication of a V2P communication to a second UE in a resource from a plurality of resources; and transmitting a message to the second UE based on the indication.

In aspect 31, the method of aspect 30 further includes that the plurality of resources are TDM with resources for non-V2P communication.

In aspect 32, the method of any of aspect 30 or aspect 31 further includes that the plurality of resources include a P2V resource portion for communication from the second UE to the first UE, and a V2P resource portion for communication from the first UE to the second UE.

In aspect 33, the method of any of aspects 30 to 32 further includes that the indication comprises a paging indicator signal, and wherein the plurality of resources further includes a paging indicator resource for the first UE to transmit the paging indicator signal to the second UE.

In aspect 34, the method of any of aspects 30 to 33 further includes that the paging indicator resource comprises a common resource pool for multiple UEs.

In aspect 35, the method of any of aspects 30 to 34 further includes that the paging indicator resource spans multiple resource blocks in a slot.

In aspect 36, the method of any of aspects 30 to 35 further includes that the paging indicator signal includes a preconfigured sequence, and the preconfigured sequence is transmitted across one or more resource blocks in a slot.

In aspect 37, the method of any of aspects 30 to 36 further includes that the paging indicator resource and the paging indicator signal are based on a location of the first UE and the second UE.

In aspect 38, the method of any of aspects 30 to 37 further includes that the P2V resource portion and the V2P resource portion span multiple resource blocks in one or more contiguous slots.

In aspect 39, the method of any of aspects 30 to 38 further includes that the paging indicator resource includes a UE-specific paging resource associated with the second UE for transmitting the paging indicator signal.

In aspect 40, the method of any of aspects 30 to 39 further includes that the UE-specific paging resource is based on one of a resource associated with the second UE for communicating with the first UE in the P2V resource portion, or an identifier of the second UE.

In aspect 41, the method of any of aspects 30 to 40 further includes that the UE-specific paging resource is based on the identifier of the second UE and an available number of resource blocks in the paging indicator resource.

In aspect 42, the method of any of aspects 30 to 41 further includes that the UE-specific paging resource is based on a subchannel used for communications of the second UE in the P2V resource portion.

In aspect 43, the method of any of aspects 30 to 42 further includes that the paging indicator resource spans one or more resource blocks of a preconfigured size.

In aspect 44, the method of any of aspects 30 to 43 further includes: selecting a sequence for the paging indicator signal, wherein the sequence comprises one of a common sequence for multiple UEs or a UE-specific sequence for the first UE.

In aspect 45, the method of any of aspects 30 to 44 further includes that the UE-specific sequence is based on an identifier of the first UE and a number of paging indication sequences for the first UE.

In aspect 46, the method of any of aspects 30 to 45 further includes: determining a UE-specific paging resource associated with the first UE for transmitting the paging indicator signal, wherein the paging indicator resource includes the UE-specific paging resource.

In aspect 47, the method of any of aspects 30 to 46 further includes that the UE-specific paging resource is based on an identifier of the first UE and an available number of resource blocks in the paging indicator resource.

In aspect 48, the method of any of aspects 30 to 47 further includes that the indication comprises information provided to the second UE in a subchannel of the V2P resource portion.

In aspect 49, the method of any of aspects 30 to 48 further includes: receiving data from the second UE in a subchannel of the P2V resource portion.

In aspect 50, the method of any of aspects 30 to 49 further includes: sensing the V2P resource portion for available subchannels; and identifying the subchannel from the available subchannels.

In aspect 51, the method of any of aspects 30 to 50 further includes that the message comprises a unicast message transmitted to the second UE in the subchannel based on the indication.

In aspect 52, the method of any of aspects 30 to 51 further includes that the V2P resource portion comprises a subchannel size that spans multiple slots.

Aspect 53 is a device including one or more processors and one or more memories in electronic communication with the one or more processors storing instructions executable by the one or more processors to cause the device to implement a method as in any of aspects 30 to 52.

Aspect 54 is a system or apparatus including means for implementing a method or realizing an apparatus as in any of aspects 30 to 52.

Aspect 55 is a non-transitory computer readable medium storing instructions executable by one or more processors to cause the one or more processors to implement a method as in any of aspects 30 to 52.

What is claimed is:

1. A method of wireless communication of a first user equipment (UE), comprising:
    monitoring a plurality of resources for an indication of a vehicle-to-pedestrian (V2P) communication from a second UE, the plurality of resources including at least a pedestrian-to-vehicle (P2V) resource portion for a first communication from the first UE to the second UE, a V2P resource portion for a second communication from the second UE to the first UE, and a non-V2P/P2V resource portion for non-V2P/P2V sidelink communication, the P2V resource portion and the V2P resource portion being time-division multiplexed (TDM) with the non-V2P/P2V resource portion;
    receiving the indication of the V2P communication in a first subchannel of the plurality of resources, the first subchannel associated with the V2P resource portion; and
    receiving a V2P message from the second UE in a second subchannel based on the indication, the second subchannel included in the V2P resource portion.

2. The method of claim 1, wherein the indication comprises a paging indicator signal, and wherein the plurality of resources further includes a paging indicator resource for the first UE to monitor the paging indicator signal from the second UE, the paging indicator resource including the first subchannel.

3. The method of claim 2, further comprising:
    refraining from monitoring the V2P resource portion for the V2P communication when the paging indicator signal is not within the paging indicator resource.

4. The method of claim 2, wherein the paging indicator resource comprises a common resource pool configured for multiple UEs.

5. The method of claim 4, wherein the paging indicator resource spans multiple resource blocks in a slot.

6. The method of claim 4, wherein the paging indicator signal includes a preconfigured sequence, and the preconfigured sequence is monitored across one or more resource blocks in a slot.

7. The method of claim 4, wherein the paging indicator resource and the paging indicator signal are based on a location of the first UE and the second UE.

8. The method of claim 4, wherein the P2V resource portion and the V2P resource portion each span multiple resource blocks in one or more contiguous slots.

9. The method of claim 2, wherein the paging indicator resource includes a UE-specific paging resource associated with the first UE for monitoring the paging indicator signal.

10. The method of claim 9, wherein the UE-specific paging resource is based on one of a resource associated with the first UE for communicating with the second UE in the P2V resource portion, or an identifier of the first UE.

11. The method of claim 10, wherein the UE-specific paging resource is based on the identifier of the first UE and a number of available or allocated resource blocks in the paging indicator resource.

12. The method of claim 10, wherein the UE-specific paging resource is based on a third subchannel used for communicating with the second UE in the P2V resource portion.

13. The method of claim 9, wherein the paging indicator resource spans one or more resource blocks.

14. The method of claim 9, wherein the paging indicator signal comprises one of a common sequence for multiple UEs or a UE-specific sequence for the second UE.

15. The method of claim 14, wherein the UE-specific sequence is based on an identifier of the second UE and an available number of paging indication sequences allocated to be paged for the second UE.

16. The method of claim 2, wherein the paging indicator resource includes a UE-specific paging resource associated with the second UE for monitoring the paging indicator signal.

17. The method of claim 16, wherein the UE-specific paging resource is based on an identifier of the second UE and a number of available paging resource blocks in the paging indicator resource.

18. The method of claim 16, wherein the paging indicator resource includes additional UE-specific paging resources assigned to additional UEs.

19. The method of claim 18, wherein the second subchannel is associated with the second UE, and the V2P message is received in the second subchannel based on receiving the paging indicator signal in the UE-specific paging resource.

20. The method of claim 1, wherein the indication comprises information from the second UE, and the first subchannel is included in the V2P resource portion.

21. The method of claim 20, further comprising:
transmitting data to the second UE in a third subchannel of the P2V resource portion.

22. The method of claim 20, wherein the V2P message comprises a unicast message received from the second UE in the second subchannel based on receiving the indication in the first subchannel.

23. The method of claim 22, further comprising:
receiving additional unicast messages from other UEs in additional subchannels of the V2P resource portion, and wherein the second subchannel and the additional subchannels are decoded for the unicast message from the second UE.

24. The method of claim 20, wherein the V2P resource portion comprises a subchannel size that spans multiple slots.

25. An apparatus for wireless communication of a first user equipment (UE), comprising:
a memory; and
at least one processor coupled to the memory and configured to:
monitor a plurality of resources for an indication of a vehicle-to-pedestrian (V2P) communication from a second UE, the plurality of resources including at least a pedestrian-to-vehicle (P2V) resource portion for a first communication from the first UE to the second UE, a V2P resource portion for a second communication from the second UE to the first UE, and a non-V2P/P2V resource portion for non-V2P/P2V sidelink communication, the P2V resource portion and the V2P resource portion being time-division multiplexed (TDM) with the non-V2P/P2V resource portion;
receive the indication of the V2P communication in a first subchannel of the plurality of resources, the first subchannel associated with the V2P resource portion; and
receive a V2P message from the second UE in a second subchannel based on the indication, the second subchannel included in the V2P resource portion.

26. A method of wireless communication at a first user equipment (UE), comprising:
providing an indication of a vehicle-to-pedestrian (V2P) communication to a second UE in a first subchannel of a plurality of resources, the plurality of resources including at least a pedestrian-to-vehicle (P2V) resource portion for a first communication from the second UE to the first UE, a V2P resource portion for a second communication from the first UE to the second UE, and a non-V2P/P2V resource portion for non-V2P/P2V sidelink communication, the P2V resource portion and the V2P resource portion being time-division multiplexed (TDM) with the non-V2P/P2V resource portion, the first subchannel being associated with the V2P resource portion; and
transmitting a V2P message to the second UE in a second subchannel based on the indication, the second subchannel included in the V2P resource portion.

27. An apparatus for wireless communication at a first user equipment (UE), comprising:
a memory; and
at least one processor coupled to the memory and configured to:
provide an indication of a vehicle-to-pedestrian (V2P) communication to a second UE in a first subchannel of a plurality of resources, the plurality of resources including at least a pedestrian-to-vehicle (P2V) resource portion for a first communication from the second UE to the first UE, a V2P resource portion for a second communication from the first UE to the second UE, and a non-V2P/P2V resource portion for non-V2P/P2V sidelink communication, the P2V resource portion and the V2P resource portion being time-division multiplexed (TDM) with the non-V2P/P2V resource portion, the first subchannel being associated with the V2P resource portion; and
transmit a V2P message to the second UE in a second subchannel based on the indication, the second subchannel included in the V2P resource portion.

* * * * *